(12) United States Patent
Oh et al.

(10) Patent No.: US 12,515,538 B2
(45) Date of Patent: Jan. 6, 2026

(54) TORQUE CONTROL METHOD OF DRIVE SYSTEM OF ELECTRIC VEHICLE

(71) Applicants: Hyundai Motor Company, Seoul (KR); Kia Corporation, Seoul (KR)

(72) Inventors: Ji Won Oh, Hwaseong-Si (KR); Ho Wook Lee, Seoul (KR); Jeong Soo Eo, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 142 days.

(21) Appl. No.: 18/387,796

(22) Filed: Nov. 7, 2023

(65) Prior Publication Data
US 2025/0001877 A1  Jan. 2, 2025

(30) Foreign Application Priority Data
Jun. 29, 2023  (KR) .................. 10-2023-0083900

(51) Int. Cl.
*B60L 15/20* (2006.01)
(52) U.S. Cl.
CPC ..... *B60L 15/2054* (2013.01); *B60L 2240/423* (2013.01); *B60L 2240/463* (2013.01); *B60L 2240/486* (2013.01)
(58) Field of Classification Search
CPC ........... B60L 15/2054; B60L 2240/423; B60L 2240/463; B60L 2240/486; B60L 2220/42; B60L 2240/421; B60L 15/20; B60L 15/10; B60L 2260/42; Y02T 10/72; Y02T 10/64; B60Y 2200/91; B60Y 2306/09
See application file for complete search history.

(56) References Cited

U.S. PATENT DOCUMENTS

| 11,625,959 | B2 | 4/2023 | Oh et al. |
| 2019/0293172 | A1* | 9/2019 | Shinohara ............. B60K 17/02 |
| 2020/0231048 | A1* | 7/2020 | Gauthier ................ B60L 15/34 |

(Continued)

FOREIGN PATENT DOCUMENTS

| CN | 113459822 A | * 10/2021 | ............. B60L 15/20 |
| KR | 10-1448746 B | 10/2014 | |

(Continued)

OTHER PUBLICATIONS

English translation of Hu et al. (CN 113459822) (Year: 2021).*

(Continued)

*Primary Examiner* — Kyle J Kingsland
(74) *Attorney, Agent, or Firm* — Morgan Lewis & Bockius LLP

(57) ABSTRACT

In a torque control method of a drive system of an electric vehicle, in which torque is generated while evading a backlash band to prevent occurrence of backlash in the drive system, a front wheel torque command is determined as a value of equal to or less than a maximum front wheel torque threshold set to a negative (−) torque value, a rear wheel torque command is determined as a value of equal to or greater than a minimum rear wheel torque threshold set to a positive (+) torque value, and when an absolute value of the maximum front wheel torque threshold, and the minimum rear wheel torque threshold are referred to as offset torques, the offset torques are values varied depending on drive system state information.

20 Claims, 13 Drawing Sheets

(56) References Cited

U.S. PATENT DOCUMENTS

| | | | |
|---|---|---|---|
| 2020/0391598 A1* | 12/2020 | Lee | H02P 6/08 |
| 2023/0318501 A1* | 10/2023 | Yamamoto | H02P 23/04 |
| | | | 701/22 |
| 2025/0065881 A1* | 2/2025 | Shen | B60W 30/20 |

FOREIGN PATENT DOCUMENTS

| | | |
|---|---|---|
| KR | 10-1704243 B | 2/2017 |
| KR | 2021-0020189 A | 2/2021 |
| KR | 2022-0096746 A | 7/2022 |

OTHER PUBLICATIONS

Prajapat, Ganesh P., N. Senroy, and I. N. Kar. "Modeling and impact of gear train backlash on performance of DFIG wind turbine system." Electric Power Systems Research 163 (2018): 356-364.
Margielewicz, Jerzy, Damian Gaska, and Grzegorz Litak. "Modelling of the gear backlash." Nonlinear Dynamics 97.1 (2019): 355-368.

* cited by examiner

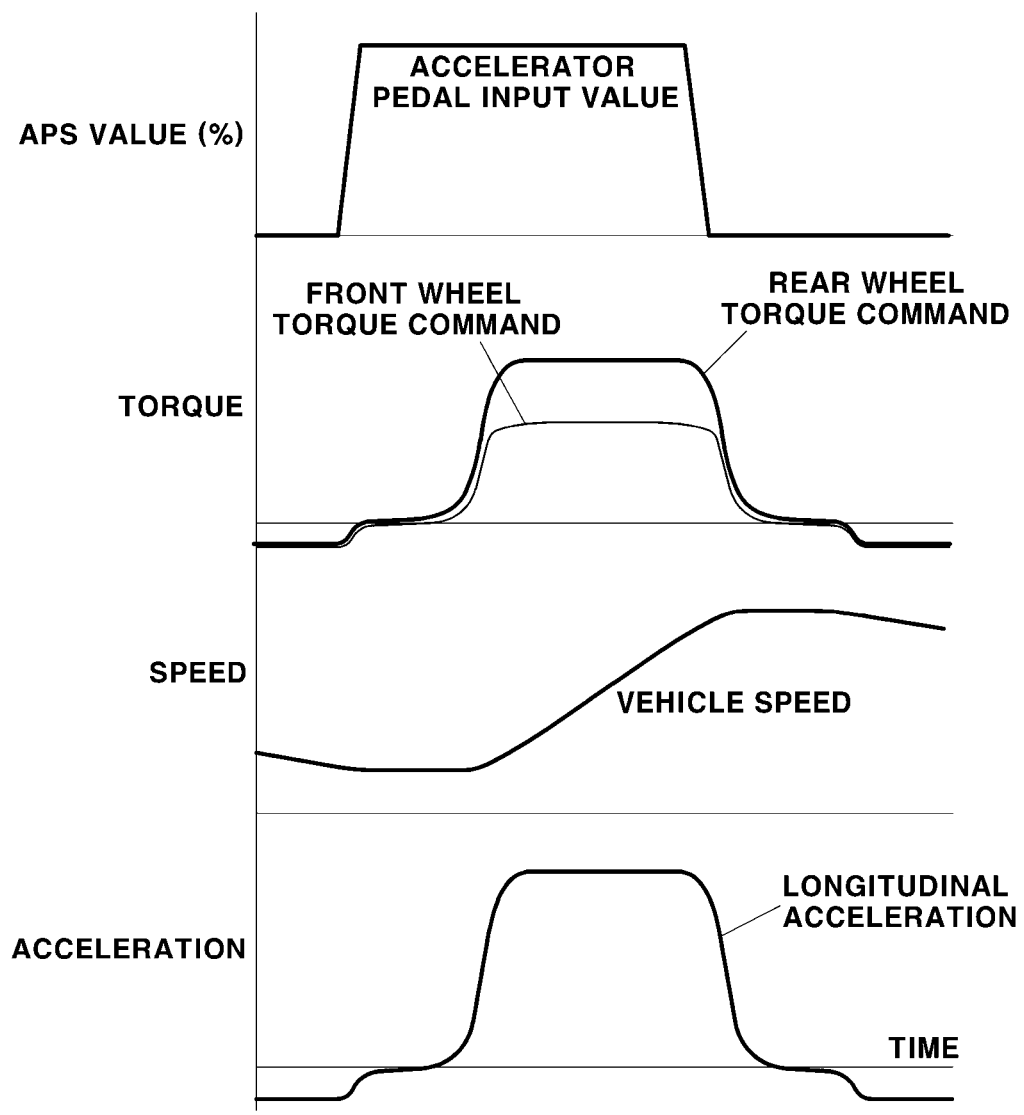

TORQUE CONTROL METHOD OF DRIVE SYSTEM OF ELECTRIC VEHICLE

CROSS-REFERENCE TO RELATED APPLICATION

The present application claims priority to Korean Patent Application No. 10-2023-0083900 filed on Jun. 29, 2023, the entire contents of which is incorporated herein for all purposes by this reference.

BACKGROUND OF THE PRESENT DISCLOSURE

Field of the Present Disclosure

The present disclosure relates to a torque control method of a drive system of an electric vehicle. More particularly, it relates to a torque control method which may generate torque while evading a backlash band of a drive system in an electric vehicle.

Description of Related Art

In general, a drive system of a vehicle needs to generate proper torque depending on a driving input value (for example, an accelerator pedal input value or a brake pedal input value) input by a driver or a torque command determined by a demand of an Advanced Driver Assistance System (ADAS).

Here, when a torque change rate is set too large, problems, such as torsion of a driveshaft, gear backlash strike, or impulsive drivability deterioration due to rapidly changing torque, occur.

On the other hand, when the torque change rate is limited too small, an excessively long time is taken to provide torque demanded by the driver or an ADAS controller, and actual vehicle behavior becomes different from driver's intention and may thus cause slow responsiveness or a dangerous situation.

A degree of reduction in Noise, Vibration, and Harshness (NVH) in the vehicle due to such rapid torque change and a degree of securement of acceleration and deceleration responsiveness of the vehicle conflict with each other.

In vehicles currently in mass production, to generate the optimum torque command to solve the above tradeoff relationship, slope limits and filters using various conditions as factors are being used.

In an electrified vehicle additionally using a motor as a drive source or a part thereof, active feedback torque correction control in which vibration, which has already happened, may be suppressed using the motor may be applied.

However, although advanced backlash post-correction control is applied, it is difficult to suppress decrease in vehicle responsiveness which is bound to chronically arise due to characteristics of hardware. Furthermore, in an electric vehicle having few vibration attenuation elements in a drive system, noise, vibration, and harshness (NVH) issues due to backlash frequently occur.

A method of reducing vibration using a deviation between a model speed of a driveshaft, generated using a disturbance observer, and an actual speed of the driveshaft is generally known. As a method of determining the model speed, a method of calculating the model speed based on a wheel speed rather than using the disturbance observer is also disclosed.

A method of reducing vibration using a deviation between a model speed of a motor, generated using an input torque model, and an actual speed of the motor is generally known.

A method of determining the slope of a torque command using speed difference between an estimated speed of a drive system, obtained using a torque model, and an actual speed of the drive system, is generally known.

However, all the above-described related art documents suggest torque correction methods to reduce and suppress vibration generated by the drive system, but do not suggest any torque determination method to prevent vibration generation.

Therefore, in relation to backlash in a drive system, a control method of generating a torque command while evading a backlash band in which backlash in the drive system may occur, rather than a control method of alleviating problems caused by backlash, is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of generating a torque command of a drive system and controlling torque in an electric vehicle, in which the torque may be generated while evading a backlash band to prevent occurrence of backlash in the drive system.

Various aspects of the present disclosure are directed to providing a torque control method of a drive system of an electric vehicle, including determining, by a controller, an overall torque command based on a requested torque depending on a vehicle driving state, and determining, by the controller, a front wheel torque command and a rear wheel torque command configured to track the overall torque command, in a state in which a responsiveness preferred mode, configured so that a front wheel torque control and a rear wheel torque control to evade respective backlash bands corresponding to torque areas of corresponding drive systems, in which backlash is capable of occurring, are performed, is selected, wherein the front wheel torque command is determined as a value of equal to or less than a maximum front wheel torque threshold set to a negative (−) torque value, the rear wheel torque command is determined as a value of equal to or greater than a minimum rear wheel torque threshold set to a positive (+) torque value, and when an absolute value of the maximum front wheel torque threshold, and the minimum rear wheel torque threshold are referred to as offset torques, the offset torques are values varied depending on drive system state information.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

BRIEF DESCRIPTION OF THE DRAWINGS

FIG. 5A is a graph illustrating a control state in an output preferred mode according to an exemplary embodiment of the present disclosure:

Figure 1:
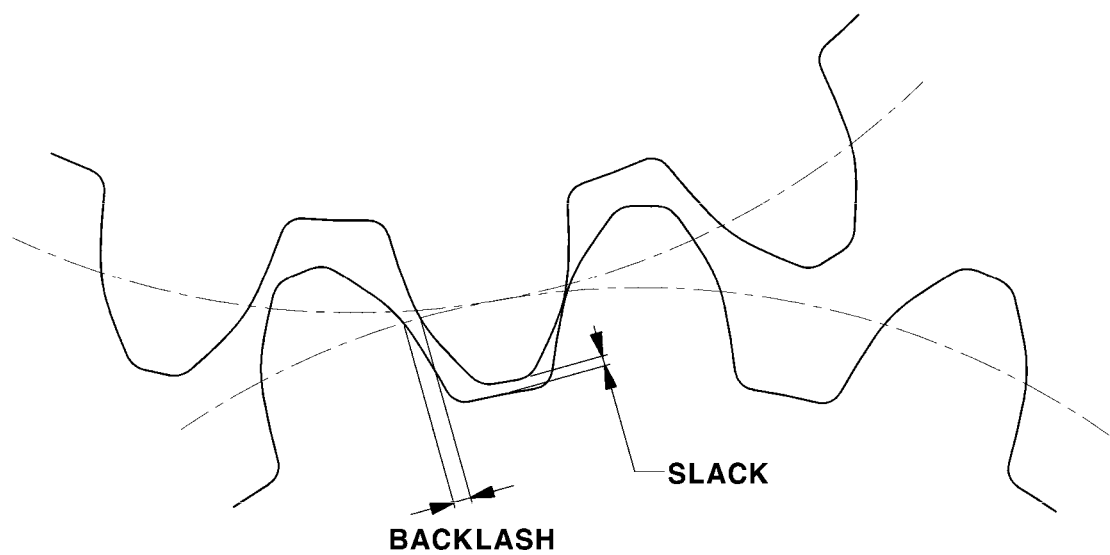
FIG. 1 is a view exemplarily illustrating backlash.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter reference will be made in detail to various embodiments of the present disclosure, examples of which are illustrated in the accompanying drawings and described below: Specific structural or functional descriptions in embodiments of the present disclosure set forth in the description which follows will be exemplarily provided to describe the exemplary embodiments of the present disclosure, and the present disclosure may be embodied in many alternative forms. Furthermore, it will be understood that the present disclosure should not be construed as being limited to the exemplary embodiments set forth herein, and the exemplary embodiments of the present disclosure are provided only to completely disclose the present disclosure and cover modifications, equivalents or alternatives which come within the scope and technical range of the present disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the drawings to refer to the same or like parts. The terminology used herein is for describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, operations, operations, elements, components, and/or combinations thereof, but do not preclude the presence or addition of one or more other features, integers, operations, operations, elements, components, and/or combinations thereof.

The present disclosure relates a torque control method of a drive system of an electric vehicle, and to a torque command generation and torque control method in which a torque command may be generated while evading a backlash band, in which backlash may occur, to prevent occurrence of backlash in a drive system, rather than a control method in which problems caused by backlash in a drive system are alleviated.

In an exemplary embodiment of the present disclosure, to generate the torque command while evading the backlash band in the drive system, a method of separating driving torque areas for a front wheel motor and a rear wheel motor from each other is used.

In an exemplary embodiment of the present disclosure, the backlash band may be defined as a torque area in which backlash may occur in the drive system of the vehicle. Here, the drive system of the vehicle includes a driving device configured to drive the vehicle, driving wheels, and further includes driving elements, such as driveshafts provided between the driving device and the driving wheels, a speed reducer, a differential, an axle, and the like.

In an exemplary embodiment of the present disclosure, the above-described drive system includes a front wheel-side drive system provided between a front wheel driving device (a front wheel motor) and front wheels, and a rear wheel-side drive system provided between a rear wheel driving device (a rear wheel motor) and rear wheels.

Furthermore, in an exemplary embodiment of the present disclosure, torque includes torque input to the drive system by the driving device and transmitted and applied to the driving wheels, and torque transmitted and applied from the driving wheels to the driving device through the drive system.

Moreover, in an exemplary embodiment of the present disclosure, torque includes driving torque to accelerate the vehicle and braking torque to decelerate the vehicle, and the braking torque (i.e., decelerating torque) means regenerative torque by the motor.

In the following description of the present disclosure, torque may be driving torque to accelerate the vehicle (in an acceleration situation) or braking torque to decelerate the vehicle (in a deceleration situation) depending on the driving situation of the vehicle, unless the torque is specified as driving torque or braking torque.

In an exemplary embodiment of the present disclosure, the driving torque and a driving torque command include a torque value to accelerate the vehicle, and the torque value is defined as a torque value in a regular direction, i.e., a positive (+) torque value. On the other hand, the braking torque and a braking torque command include a torque value to decelerate the vehicle, and the torque value is defined as a torque value in a reverse direction, i.e., a negative (−) torque value.

In the following description, when a front wheel torque command and a rear wheel torque command represent negative (−) torque values, the front wheel torque command and the rear wheel torque command representing the negative (−) torque values mean regenerative torque commands.

Positive (+) torque, i.e., torque in the regular direction, or Negative (−) torque, i.e., torque in the reverse torque, is applied to the drive system depending on whether or not the vehicle is accelerated or decelerated while driving, as described above, and the direction of torque input to the drive system and transmitted through the drive system may be changed depending on the driving situation of the vehicle.

The present disclosure is devised based on the principle that problems caused by backlash occur mainly in a torque area in which torque is close to 0, and such a torque area in which torque is close to 0 may be referred to a backlash band in which backlash problems occur.

In an exemplary embodiment of the present disclosure, the backlash band may be set to a torque range including boundaries defined by a lower threshold including a negative (−) value and an upper threshold including a positive (+) value. That is, the backlash band may be set to a torque range including torque of zero, and a backlash state may occur when input torque applied from the motor, which is a driving device, to the drive system or from the driving wheel to the drive system enters the above-set backlash band.

Backlash is a clearance between engaged teeth of two gears, as shown in FIG. 1. Vibration or noise caused by striking of the gear teeth against each other may occur between the two engaged gears due to the backlash, and the backlash may cause damage to the gears in the worst case.

When torque is continuously applied in one direction, one of the two engaged gears continuously transmits force to the other, and thus, the teeth of the two engaged gears maintain an aligned and engaged state in the regular direction, and problems due to backlash do not occur.

However, when the direction of torque is changed, the direction of transmission of force is changed, backlash occurs, and then, the teeth of the gears are aligned in the reverse direction. While force is continuously transmitted in the same direction after alignment of the teeth of the gears in the reverse direction, engagement between the gears is not released, and thus, problems due to the backlash do not occur.

However, at the moment when the direction of transmission of force is changed, after engagement between the teeth of the two gears is released, when the teeth of the gears are again engaged with each other while passing through a clearance for engagement, problems due to the backlash occur.

Therefore, the key to a method of preventing occurrence of the backlash problems is to remove or minimize situations in which gear engagement is released, and this may be achieved by removing or minimizing change of the direction of a torque command for the driving device, such as the motor.

To minimize change of the direction of the torque command, the front and rear wheel driving devices, i.e., the front wheel motor and the rear wheel motor, may share a role, and for the present purpose, it may be considered that torque driving areas for the front wheel motor and the rear wheel motors are separated from each other.

Figure 2:
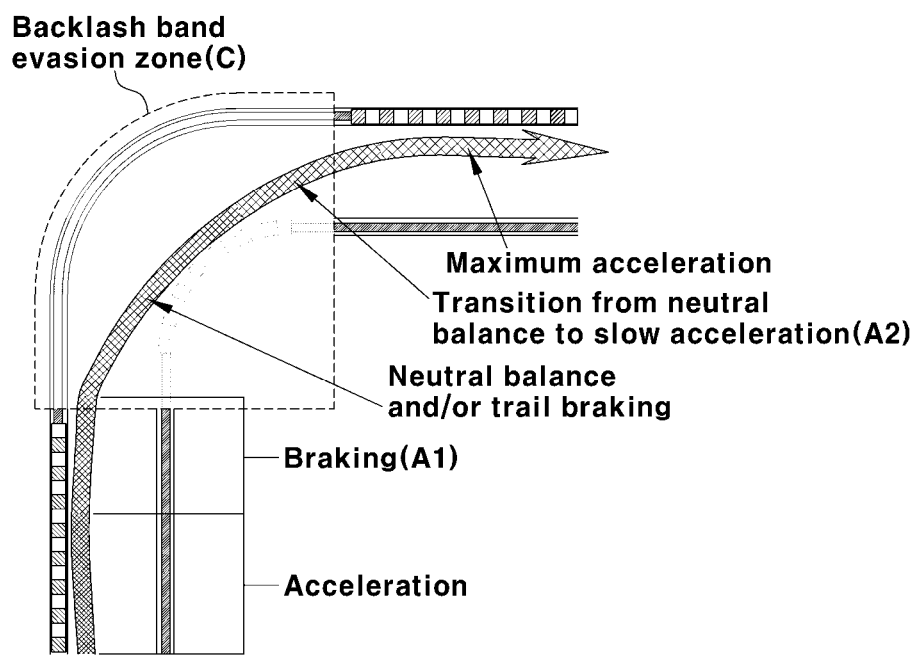
FIG. 2 is a view exemplarily illustrating a zone in which backlash band evasion control may be performed when a vehicle travels on a track according to an exemplary embodiment of the present disclosure.

FIG. 2 is a view exemplarily illustrating acceleration and deceleration guide for ideal track turning behavior, and shows a zone C in which backlash band evasion control may be performed when the vehicle travels on a track.

Technology for inducing fun-driving on a track based on track information including track position information and track route information (including turning section information), which are pre-acquired, and real-time vehicle position information is already being applied to mass-production.

In an exemplary embodiment of the present disclosure, a controller may be configured to determine whether or not the vehicle enters the track based on track position information, and may automatically determine whether or not backlash band evasion control configured for minimizing a lap time is executed based on track route information including turning section information and real-time vehicle position information on the track in a track mode in which the vehicle travels along the track. Through the present determination, entry into and release from a backlash band evasion mode may be selected autonomously depending on the position of the vehicle on a track route.

Referring to FIG. 2, a turning section C of the track may be referred to as "the backlash band evasion zone" in which backlash band evasion control may be executed. The turning section C of the track may be defined as a section from at least a part of one end of a braking section marked with "A1" and "Braking" to a part of a gradual acceleration section marked with "A2", and the maximum acceleration torque is not used in such a turning section C.

That is, an even-throttle or neutral balance section requiring precise longitudinal load transfer control and responsiveness of the vehicle, such as the turning section C of the track, does not require the maximum acceleration torque.

Therefore, it is very effective to execute the backlash band evasion control only while the vehicle passes through the turning section C, and thus, in an exemplary embodiment of the present disclosure, the controller may be set to automatically select the backlash band evasion mode based on the track information and the real-time vehicle position information on the track only while the vehicle passes through the above turning section C.

That is, the controller may be configured to determine that the backlash band evasion mode is selected when the driving mode of the vehicle is a track mode in which the vehicle passes through the turning section C, and may perform a control process in a responsiveness preferred mode, which is the backlash band evasion mode. Of course, when the controller is configured to determine that an output preferred mode (a general mode), which is a conventional torque control mode, is selected, the controller may perform a control process in the output preferred mode.

Hereinafter, the present disclosure is devised based on the fact that the maximum output required while the vehicle turns on the track, as shown in FIG. 2, during performance-oriented driving does not come up to the maximum output which may be provided by the driving device of the vehicle.

When the maximum torque is forcibly generated in a harsh turning section, stability in vehicle behavior may be seriously deteriorated, and therefore, such a control general strategy of generating the maximum torque is not effective.

Therefore, the controller may actively determine whether or not to select the output preferred mode in which the maximum output may be generated or to select the responsiveness preferred mode in which responsiveness is prioritized by evading the backlash band even though the maximum output is limited, as a torque control mode of the vehicle, by determining whether or not the vehicle is in a performance-oriented driving situation and a turning situation.

In the following description, the conventional torque control mode in which the maximum output may be generated is referred to as "the output preferred mode" or "the general mode", and a torque control mode in which the backlash band evasion control configured to evade the backlash band is performed is referred to as "the responsiveness preferred mode" or "the backlash band evasion mode".

Furthermore, a function of actively transitioning between the output preferred mode and the responsiveness preferred mode to ultimately assist performance-oriented driving is referred to as "an active throttle balancing assistance function" or "an active even-throttle assistance function".

In an exemplary embodiment of the present disclosure, throttle balancing assistance (even-throttle assistance) control is performed in the state in which the vehicle enters the responsiveness preferred mode. In the following description, "throttle balancing" and "even-throttle" may be understood as including the same meaning.

Figure 3:
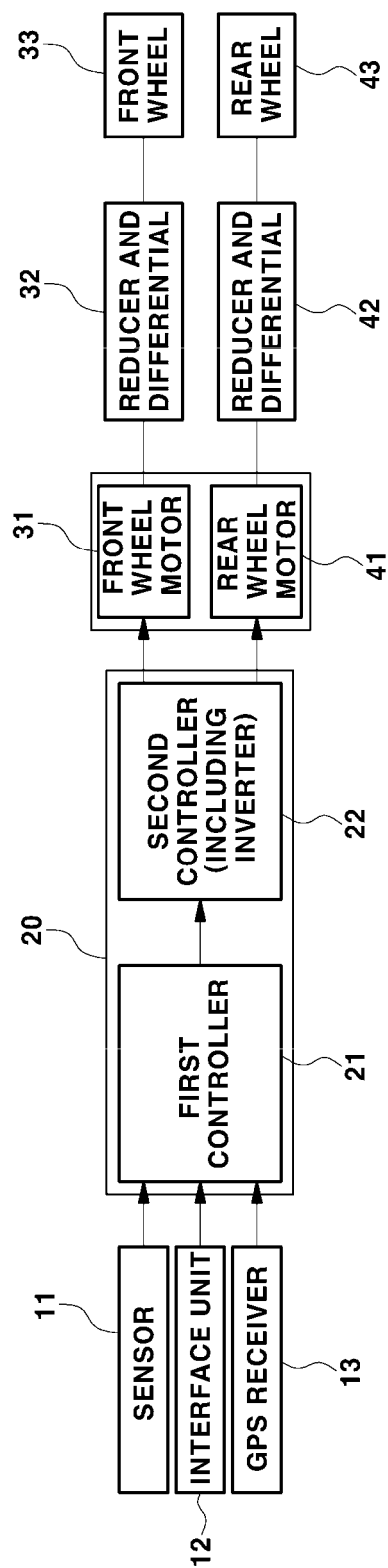
FIG. 3 is a block diagram showing the configuration of an apparatus for performing a drive system torque control process according to an exemplary embodiment of the present disclosure.
Figure 4:
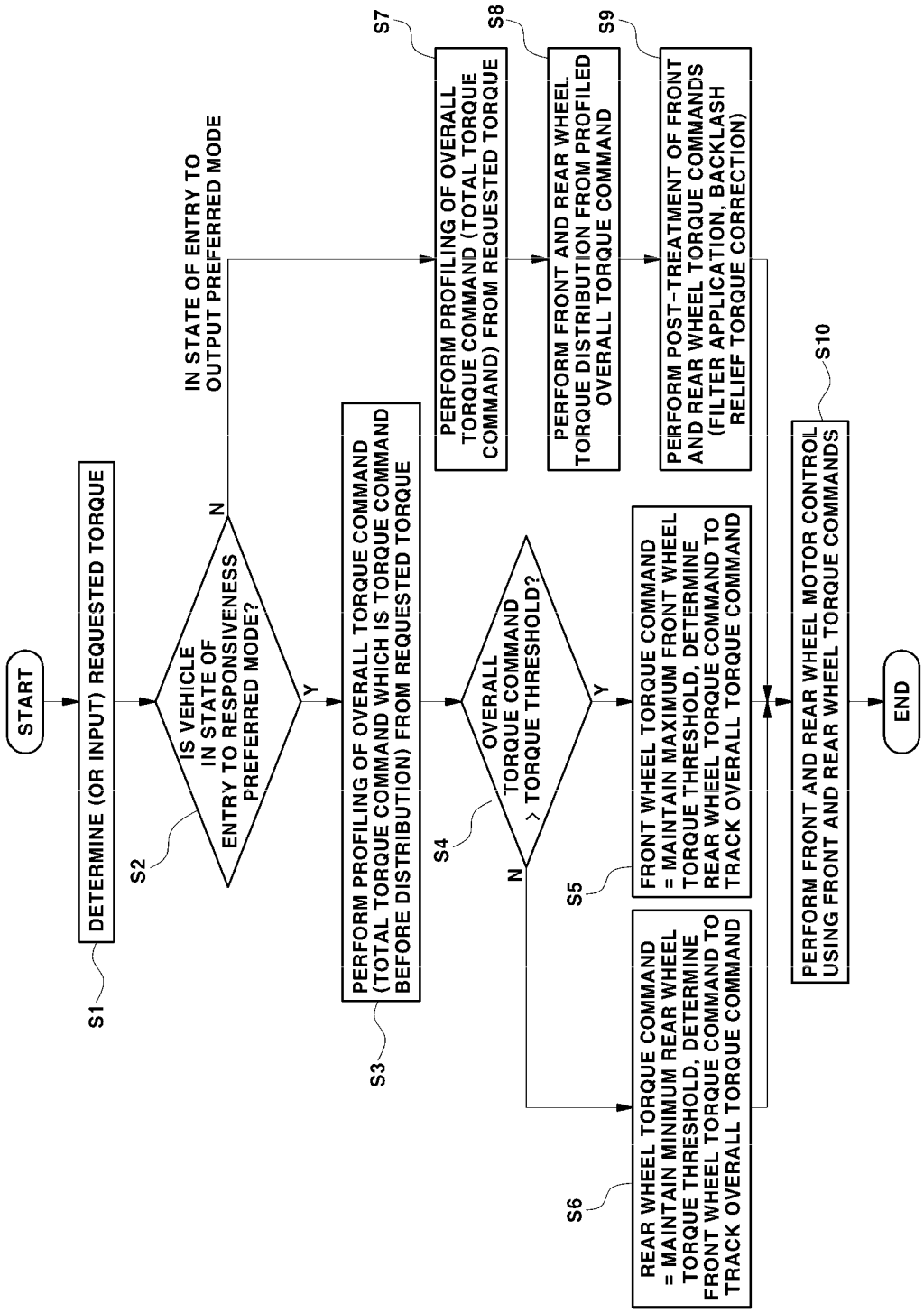
FIG. 4 is a flowchart representing the drive system torque control process according to an exemplary embodiment of the present disclosure.

FIG. 3 is a block diagram showing the configuration of an apparatus for performing a drive system torque control process according to various exemplary embodiments of the present disclosure, and FIG. 4 is a flowchart representing the drive system torque control process according to various exemplary embodiments of the present disclosure.

The present disclosure may be applied to a vehicle provided with a plurality of driving devices as driving sources of the vehicle, more particularly, to a vehicle in which front wheels 33 and rear wheels 43 are driven by independent driving devices. Furthermore, the present disclosure may be applied to an electric vehicle traveling using motors 31 and 41 as driving devices.

In more detail, the present disclosure may be applied to a vehicle provided with a front wheel driving device which applies torque to the front wheels 33, and a rear wheel driving device which applies torque to the rear wheels 43. Here, the front wheels 33 and the rear wheels 43 are driving wheels connected to the corresponding driving devices so that power may be transmitted between the driving wheels and the driving devices.

Furthermore, the present disclosure may be applied to a vehicle in which the front wheel driving device and the rear wheel driving device are motors. In the following description, the motor 31 configured to drive the front wheels 33 is referred to as "a front wheel motor", and the motor 41 configured to drive the rear wheels 43 is referred to as "a rear wheel motor".

FIG. 3 shows the front wheel motor 31 and the rear wheel motor 41 as the driving devices of an electric vehicle. The front wheel motor 31 and the rear wheel motor 41 are connected to the front wheels 33 and the rear wheels 43, which are driving wheels, through driving elements, such as reducers and differentials 32 and 42, and axles, respectively so that power may be transmitted between the front and rear wheel motors 31 and 41 and the front and rear wheels 33 and 43.

Therefore, torques output from the front wheel motor 31 and the rear wheel motor 41 may be transmitted to the front wheels 33 and the rear wheels 43 through the driving elements, such as the reducers and the differentials 32 and 42, and the axles.

Furthermore, although not shown in FIG. 3, batteries are connected to the front wheel motor 31 and the rear wheel motor 41 via inverters to be configured for being charged and discharged. The inverters may include a front wheel inverter configured to drive and control the front wheel motor 31, and a rear wheel inverter configured to drive and control the rear wheel motor 41.

Operation (driving and regenerative braking) of the front wheel motor 31 and the rear wheel motor 41 in the electric vehicle is controlled by torque commands generated by a controller 20. The controller 20 is configured to determine requested torque depending on the driving state of the vehicle to drive the vehicle, and generates a final torque command (an overall torque command) based on the determined requested torque.

Furthermore, the controller 20 is configured to control operation of the front wheel motor 31 and the rear wheel motor 41 through the inverters depending on the final torque command. In the following description, a torque command including a positive (+) value is defined as a driving torque command, and a torque command including a negative (−) value is defined as a regenerative torque command.

Here, the final torque command is a requested torque command required to drive the vehicle, and is a torque command before torque distribution to the front wheels 33 and the rear wheels 43. In the following description, a torque command before distribution, a total torque command, a requested torque command, and an overall torque command are all used in the same sense.

In an exemplary embodiment of the present disclosure, the controller 20 may include a first controller 21 which is configured to determine requested torque based on a driving input value input by a driver or receives requested torque from other controllers such as an Advanced Driver Assistance System (ADAS) controller, and generates and outputs the final torque command (i.e., a requested torque command) based on the requested torque, and a second controller 22 which is configured to control operation of the front wheel motor 31 and the rear wheel motor 41 depending on the final torque command input from the first controller 21.

The first controller 21 may be a Vehicle Control Unit (VCU) which is configured to determine and generates a torque command to control operation of a motor in a general vehicle. A method of determining the torque command in the vehicle and a process thereof are known in the art, and a detailed description thereof will thus be omitted.

The first controller 21 may be configured to determine a front wheel torque command and a rear wheel torque command through a front and rear wheel torque distribution process from the final torque command. When the first controller 21 outputs a final front wheel torque command and a final rear wheel torque command, the second controller 22 receives the final front wheel torque command and the final rear wheel torque command, and is configured to control operation of the front wheel motor 31 and the rear wheel motor 41 through the front wheel inverter and the rear wheel inverter.

The second controller 22 may be a general Motor Control Unit (MCU) which is configured to control operation of a driving motor through an inverter depending on a torque command output by a Vehicle Control Unit in an electric vehicle.

Although a control subject includes the first controller 21 and the second controller 22 in the above description, the torque control process according to an exemplary embodiment of the present disclosure may be performed by one integrated control element rather than a plurality of controllers.

A plurality of controllers and one integrated control element may be commonly called controller, and the torque control process according to an exemplary embodiment of the present disclosure, which will be described below, may be executed by the controller.

In an exemplary embodiment of the present disclosure, vehicle driving information, such as a driving input value input to the controller 20 by the driver, indicates the driving state of the vehicle, and may include sensor detected information which is detected by sensors 11 and input to the controller 20 through a vehicle network.

Here, the sensors 11 which detect the vehicle driving information may include an accelerator pedal sensor (APS) configured to detect an accelerator pedal input value (%) input by the driver, a brake pedal sensor (BPS) configured to detect a brake pedal input value (%) input by the driver, sensors configured to detect speeds of the front wheel-side drive system and the rear wheel-side drive system, and a sensor configured to detect a vehicle speed.

Here, the speeds of the drive systems may be rotating speeds of the driving motors, i.e., the front wheel motor 31 and the rear wheel motor 41, or rotating speeds (wheel speeds) of the driving wheels 33 and 43. Here, the sensors configured to detect the speeds of the drive systems may be sensors which detect the rotating speeds of the respective motors 31 and 41, and these sensors may be general resolvers which detect the positions of rotators of the motors 31 and 41. Otherwise, the sensors configured to detect the speeds of the drive systems may be general wheel speed sensors which detect the rotating speeds (wheel speeds) of the driving wheels 33 and 43.

Furthermore, the sensor configured to detect the vehicle speed may also be a wheel speed sensor. Acquisition of vehicle speed information from a signal from the wheel speed sensor is well-known in the art, and a detailed description thereof will thus be omitted.

As the vehicle driving information detected by the above-described sensors 11 and input to the controller 20 to determine and generate the requested torque and the torque command, the accelerator pedal input value (an APS value, %) input by the driver, the brake pedal input value (a BPS value, %) input by the driver, the rotating speeds of the motors 31 and 41, the rotating speeds of the driving wheels 33 and 43, and the vehicle speed may be selectively used.

Among the vehicle driving information, the accelerator pedal input value (the APS value) input by the driver and the brake pedal input value (the BPS value) input by the driver may be referred to as driving input information input by the driver, and the rotating speeds of the motors 31 and 41, the rotating speeds of the driving wheels 33 and 43, and the vehicle speed may be referred to as vehicle state information.

Furthermore, the vehicle driving information may include information determined by the controller 20 by itself in a broad sense, and may further include information (for example, requested torque information) input from other controllers (for example, the ADAS controller) in the vehicle to the controller 20 through the vehicle network.

In FIG. 3, reference numeral "12" indicates an interface connected to the controller 20 in the vehicle, and the interface 12 may include an input unit and an output unit. In an exemplary embodiment of the present disclosure, the interface 12 is provided to enable driver's operation, input and selection, and display of various information, and may be used to operate ON/OFF of the responsiveness preferred mode (the backlash band evasion mode) or to provide various user interfaces (UIs).

In an exemplary embodiment of the present disclosure, the input unit and the output unit of the interface 12 may employ any known devices which may perform ON/OFF operation of the responsiveness preferred mode, and input, selection and display of various information, and the like.

For example, the interface 12 may include an operation device including buttons or switches, an input unit or a display device of an Audio, Video and Navigation (AVN) system, or a touchscreen, which is provided in the vehicle.

In FIG. 3, reference numeral "13" indicates a Global Positioning System (GPS) receiver mounted in the vehicle and connected to the controller 20, and the GPS receiver 13 is provided to receive a GPS signal indicating the current position of the vehicle from the outside of the vehicle.

The GPS receiver 13 is provided to input the received signal to the controller 20. Accordingly, the controller 20 may be configured to determine in real time the current position of the vehicle from the GPS signal received and input through the GPS receiver 13.

Furthermore, various aspects of the present disclosure are directed to providing a method of generating a torque command while evading the backlash band in which backlash may occur. Here, evasion of the backlash band is prevention of a situation in which a torque command invades the backlash band as much as possible.

This may be achieved through a method in which the front wheel torque (indicating actual torque) and the front torque command maintain only a negative (−) torque value, and the rear wheel torque (indicating actual torque) and the rear torque command maintain only a positive (+) torque value. As described above, a backlash issue tends to arise when the direction of torque is changed.

Such a strategy is the most necessary condition for the throttle balancing assistance (even-throttle assistance) control in the turning section when the vehicle travels on the track. Therefore, the backlash band evasion strategy may be representatively applied to a vehicle throttle balancing assistance (even-throttle assistance) situation.

When such a strategy is applied, the rear wheel-side drive system continuously aligns gears in a positive (+) torque transmission direction to prevent the gears from invading the backlash band, and this may be achieved by continuously generating at least a small amount of torque in the positive (+) direction.

Here, the small amount of the torque in the positive (+) direction to continuously align the gears in the positive (+) torque transmission direction may be defined as a minimum rear wheel torque threshold (having a positive value), and the value of the rear wheel torque command (i.e., a positive value) during the backlash band evasion control may be set in a range equal to or greater than the predetermined minimum rear wheel torque threshold.

In the same manner, the front wheel-side drive system continuously aligns gears in a negative (−) torque transmission direction to prevent the gears from invading the backlash band, and this may be achieved by continuously generating at least a small amount of torque in the negative (−) direction.

Here, the small amount of the torque in the negative (−) direction to continuously align the gears in the negative (−) torque transmission direction may be defined as a maximum front wheel torque threshold (having a negative value), and the value of the front wheel torque command (i.e., a negative value) during the backlash band evasion control may be set in a range equal to or less than the predetermined maximum front wheel torque threshold.

In an exemplary embodiment of the present disclosure, the minimum rear wheel torque threshold may be set in the controller 20 as a torque value outside the backlash band, i.e., a torque area in which backlash may occur, in the rear wheel-side drive system. That is, the minimum rear wheel torque threshold may be set to a value of greater than the upper threshold of the backlash band in the rear wheel-side drive system.

In the same manner, the maximum front wheel torque threshold may be set in the controller 20 as a torque value outside the backlash band, i.e., a torque area in which backlash may occur, in the front wheel-side drive system. That is, the maximum front wheel torque threshold may be set to a value of less than the lower threshold of the backlash band in the front wheel-side drive system.

However, the present method is disadvantageous in that, because only one of the motor of the front wheel axle and the motor of the rear wheel axle is used for acceleration and regenerative braking (deceleration), the maximum output may be insufficient compared to use of both motors for all purposes.

That is, only one of the front wheel motor 31 and the rear wheel motor 41 is used, and thus, the maximum output may be insufficient compared to use of both the front wheel motor 31 and the rear wheel motor 41 for acceleration or regenerative braking. Accordingly, it may be difficult to exhibit the maximum acceleration performance or to perform maximum regenerative braking.

However, in consideration of a principle that load transfer is concentrated on the rear wheels and the torque of the rear wheel axle plays a major role during acceleration and on the contrary load transfer is concentrated on the front wheels and the torque of the front wheel axle plays a major role during deceleration, the backlash band evasion strategy suggested in an exemplary embodiment of the present disclosure does not cause much performance deterioration.

Nevertheless, when only the motor on one axle is used, the maximum performance, which may be exhibited by use of the motors on both axles, is not exhibited, and thus, to solve such a limit, the following countermeasure will be considered.

First, the controller 20 may set the responsiveness preferred mode, and the responsiveness preferred mode may be selectively performed. The responsiveness preferred mode may be referred to as the backlash band evasion mode in which the backlash band evasion control is performed.

ON/OFF operation of the responsiveness preferred mode may be selected by operation of the interface 12 by the driver. That is, the driver may turn on or off the responsiveness preferred mode using the interface 12 connected to the controller 20.

Figure 5B:
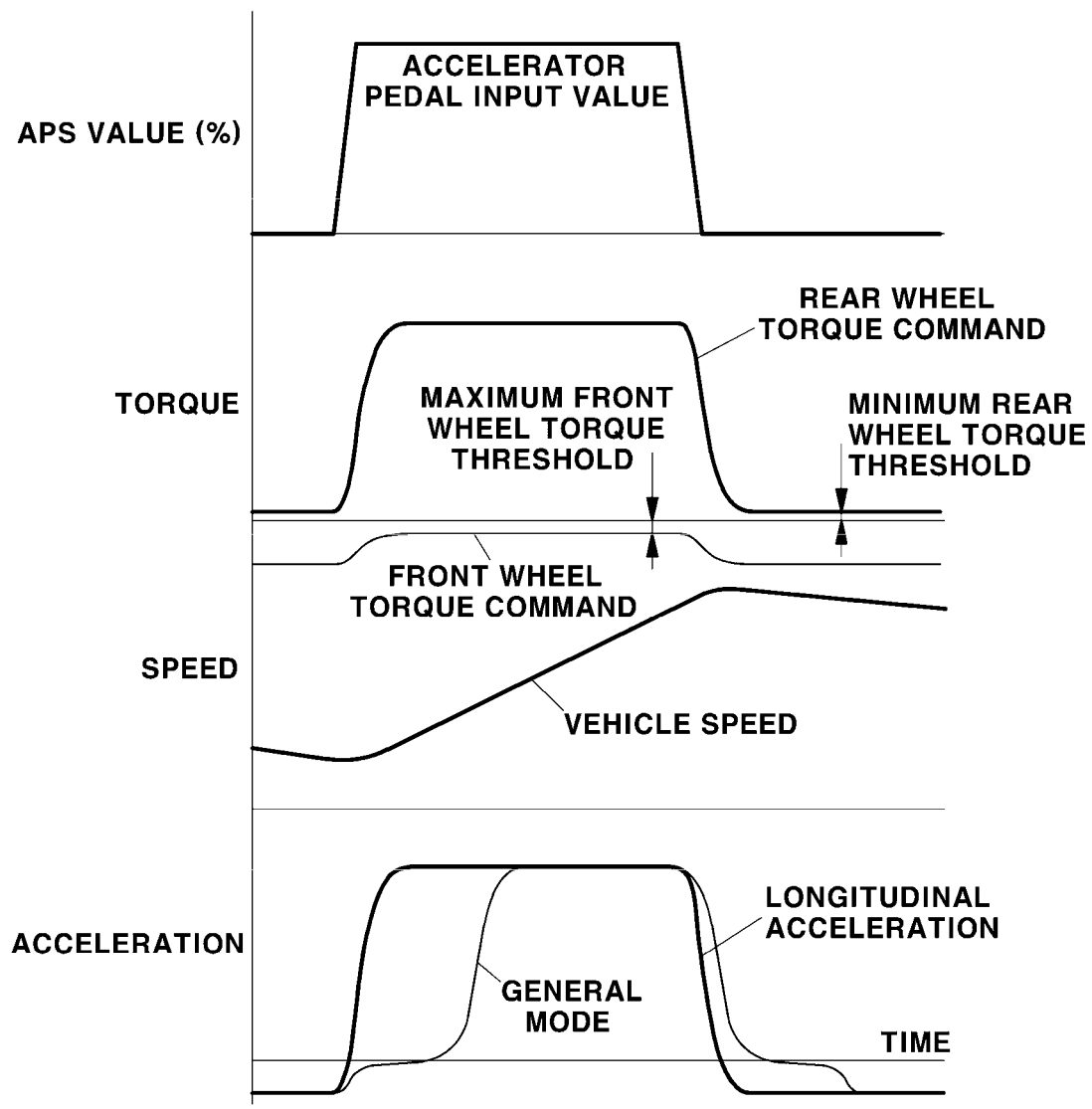
FIG. 5B is a graph illustrating a control state in a responsiveness preferred mode according to an exemplary embodiment of the present disclosure.

FIG. 5A is a graph illustrating a control state in the output preferred mode (the general mode) according to various exemplary embodiments of the present disclosure, i.e., when the responsiveness preferred mode is turned off, and FIG. 5B is a graph illustrating a control state in the responsiveness preferred mode (the backlash band evasion mode) according to various exemplary embodiments of the present disclosure.

FIG. 5A and FIG. 5B illustrate front and rear torque distribution states and front and rear wheel torque command determination methods by the controller 20 during control in the output preferred mode (the general mode) and during control in the responsiveness preferred mode (the backlash band evasion mode), when an accelerator pedal input value (an APS value) is detected by the sensor 11.

In an exemplary embodiment of the present disclosure, in the state in which the driver turns off the responsiveness preferred mode through the interface 12, the controller 20 may not enter the responsiveness preferred mode although the vehicle satisfies predetermined entry conditions for the vehicle driving information. Here, the output preferred mode (the general mode) may be maintained in the state in which the responsiveness preferred mode is released, and control in the output preferred mode may be continuously performed.

On the other hand, when the driver turns on the responsiveness preferred mode through the interface 12, the controller 20 may enter the responsiveness preferred mode when the vehicle satisfies the predetermined entry conditions. Here, control in the responsiveness preferred mode may be performed in the state in which the output preferred mode is released.

In an exemplary embodiment of the present disclosure, the throttle balancing (even-throttle) assistance function is performed in the responsiveness preferred mode, and in the state in which the controller 20 enters the responsiveness preferred mode, the controller 20 is configured to perform backlash band evasion control in which the front wheel torque command is limited to the maximum front wheel torque threshold or less than the maximum front wheel torque threshold or the rear wheel torque command is limited to the minimum rear wheel torque threshold or more than the minimum rear wheel torque threshold.

In the responsiveness preferred mode which is the backlash band evasion mode, the front wheel motor 31 and the rear wheel motor 41 do not generate driving force in the same direction or regenerative braking force in the same direction, which is to say, the front wheel motor 31 is configured to perform only regenerative braking and the rear wheel motor 41 is configured to perform only driving, and thus, it is impossible to perform driving and regenerative braking of the vehicle with the maximum output.

Instead, in the state of entry to the responsiveness preferred mode, zero-crossing of torque in which the front wheel torque command or the rear wheel torque command passes through a point where torque is zero within the backlash band is not necessary, and thus, responsiveness may be secured, in contrast to the output preferred mode (the general mode) which is the conventional torque control method.

Furthermore, the output preferred mode (the general mode) performed in an exemplary embodiment of the present disclosure when the responsiveness preferred mode is released is the same as the conventional torque control mode. When the controller 20 enters the output preferred mode, the front wheel motor 31 and the rear wheel motor 41 are configured to perform driving and regenerative braking of the vehicle in cooperation with each other, and may thus perform driving and regenerative braking of the vehicle with the maximum output.

However, in the state of entry to the output preferred mode entry state after release of the responsiveness preferred mode, zero-crossing of torque is inevitable, and thus, responsiveness delay inevitably occurs.

Hereinafter, the drive system torque control process according to various exemplary embodiments of the present disclosure will be described with reference to FIG. 4. First, the controller 20 receives vehicle driving information detected by the sensors 11, and is configured to determine requested torque by itself based on the vehicle driving information in the same manner as in the conventional drive system torque control process, or receives the requested torque from other controllers (Operation S1 in FIG. 4).

Furthermore, when the controller 20 selects the output preferred mode and the vehicle enters the output preferred mode in Operation S2 in FIG. 4, the controller 20 is configured to perform overall torque command profiling in the output preferred mode (the general mode) based on the requested torque (Operation S7 in FIG. 4).

In an exemplary embodiment of the present disclosure, profiling of an overall torque command (i.e., a total torque command, a torque command before distribution, and a requested torque command), and determination of the final overall torque command based on the requested torque may be understood in the same sense.

In the following description, the total torque command means the overall torque command which is the torque command before distribution, and means a torque command acquired by summing the front wheel torque command and the rear wheel torque command (i.e., a torque command including the sum total of torque values). In an exemplary embodiment of the present disclosure, torque commands for respective wheels or torque commands for respective axles refer to the front wheel torque command and the rear wheel torque command.

Furthermore, in an exemplary embodiment of the present disclosure, invasion or entry to the backlash band indicates the case that the torque value of a corresponding torque command becomes a torque value in the backlash band, and passage through the backlash band indicates the case that the torque value of a corresponding torque command continuously increases or decreases, after having invading the backlash band from the outside of the backlash band, and thus deviates from the backlash band.

In the output preferred mode (the general mode), to satisfy the requested torque using torques applied by the front wheel motor and the rear wheel motor, the front wheel torque command and the rear wheel torque command are determined and operated in all torque areas including positive (+) torque values and negative (−) torque values depending on the overall torque command (the total torque command) which is the torque command before distribution.

For example, in the output preferred mode (the general mode), both the front wheel torque command and the rear wheel torque command may be determined as negative (−) torque values in a situation in which there is no accelerator pedal input by the driver, i.e., in a vehicle deceleration situation in which the driver does not depress the accelerator pedal.

Thereafter, in the output preferred mode, when the driver depresses the accelerator pedal to accelerate the vehicle, both the front wheel torque command and the rear wheel torque command are converted from the negative (−) torque values into positive (+) torque values. In the output preferred mode, when the torque direction is changed, both the front wheel torque command and the rear wheel torque command inevitably pass through the respective backlash bands.

Here, the front wheel torque command and the rear wheel torque command are determined by the conventional front and rear wheel torque distribution process in which the sum of the front wheel torque command and the rear wheel torque command tracks the overall torque command, and the overall torque command is distributed depending on a front and rear wheel distribution ratio (Operation S8 in FIG. 4).

While the torques pass through the corresponding backlash bands, although the driver depresses the accelerator pedal, the direction of the torques applied from the motors to the drive systems is not rapidly changed to minimize the backlash problems.

That is, as shown in FIG. 5A, in the output preferred mode, the front wheel torque command and the rear wheel torque command are not converted from the negative (−) torque values into positive (+) torque values immediately when the driver depresses the accelerator pedal, and the front wheel torque command and the rear wheel torque command are set so that the direction of torques applied to the drive systems by the motors is changed for a designated time after the driver depresses the accelerator pedal while passing through the backlash bands.

Accordingly, for the time when the torques pass through the backlash bands, the front wheel torque command and the rear wheel torque command are not rapidly increased by performing torque slope control in which the slopes (i.e., the change rates) of the front wheel torque command and the rear wheel torque command are limited. In the case of the output preferred mode, backlash control is performed so that, in the case of both the front wheel torque command and the rear wheel torque command, torques are slowly changed within the corresponding backlash bands.

For the present purpose, the controller 20 may set maximum allowable change rates of the front wheel torque command and the rear wheel torque command in the corresponding backlash bands to small values that do not cause backlash shock.

Therefore, while the front wheel torque command and the rear wheel torque command are increased and pass through the corresponding backlash bands, the controller 20 is configured to determine the front wheel torque command and the rear wheel torque command as values changed slowly depending on the maximum allowable change rates set to the small values.

Furthermore, after passing through the backlash bands, the front wheel torque command and the rear wheel torque command are determined as values which may satisfy driving torque required for acceleration of the vehicle through the conventional front and rear wheel torque distribution process.

As described above, in the output preferred mode, when the driver depresses the accelerator pedal, that is, in an acceleration situation, both the front wheel torque command and the rear wheel torque command are converted from negative (−) torque values into positive (+) torque values, and when such a torque direction is changed, both the front wheel torque command and the rear wheel torque command pass through the corresponding backlash bands.

In such an output preferred mode, to minimize problems caused by backlash, backlash control in which the slopes of the front wheel torque command and the rear wheel torque command are limited to the maximum allowable change rates is performed, and therefore, acceleration delay of the vehicle in the backlash bands inevitably occurs.

On the other hand, in the output preferred mode, when the driver suddenly releases the accelerator pedal (i.e., tip-out) in the state in which the driver depresses the accelerator pedal, the front wheel torque command and the rear wheel torque command are converted from the positive (+) torque values into negative (−) torque values. Even when the torque direction is changed reversely, both the front wheel torque command and the rear wheel torque command inevitably pass through the corresponding backlash bands.

Although regenerative torque for coasting deceleration driving is required after the tip-out maneuver of the accelerator pedal, the direction of torques applied from the motors to the drive systems is not rapidly changed to minimize problems caused by backlash while the front wheel torque command and the rear wheel torque command pass through the corresponding backlash bands.

That is, as shown in FIG. 5A, the front wheel torque command and the rear wheel torque command are not converted from the positive (+) torque values into the negative (−) torque values immediately when the tip-out maneuver of the accelerator pedal by the driver is performed, and the front wheel torque command and the rear wheel torque command are set so that the direction of the torques applied to the drive systems by the motors is changed for a designated time after the tip-out maneuver of the accelerator pedal while passing through the backlash bands.

Accordingly, for the time when the torques pass through the backlash bands, the front wheel torque command and the rear wheel torque command are not rapidly decreased by performing torque slope control in which the slopes (i.e., the change rates) of the front wheel torque command and the rear wheel torque command are limited.

Backlash control is performed so that, in the case of both the front wheel torque command and the rear wheel torque command, the torques are slowly changed in the backlash bands. At the instant time, the controller 20 is configured to determine the front wheel torque command and the rear wheel torque command as values changed slowly depending on the maximum allowable change rates set to the small values.

Furthermore, after passing through the backlash bands, the controller 20 is configured to perform the conventional front and rear wheel torque distribution to satisfy regenerative torque required for coasting deceleration driving, and is configured to determine a front wheel torque command and a rear wheel torque command which may satisfy a regenerative torque command (a torque command before distribution), which is a total torque command during coasting deceleration driving.

As described above, in the output preferred mode, when the driver performs the tip-out maneuver of the accelerator pedal, that is, in a coasting deceleration situation, both the front wheel torque command and the rear wheel torque command are converted from the positive (+) torque values into negative (−) torque values, and when the torque direction is changed, both the front wheel torque command and the rear wheel torque command pass through the corresponding backlash bands. Therefore, deceleration delay of the vehicle inevitably occurs during the tip-out maneuver of the accelerator pedal.

In the output preferred mode, when the front wheel torque command and the rear wheel torque command are determined through front and rear wheel torque distribution, post-treatment of the determined front and rear wheel torque commands may be performed. Here, a final front wheel torque command and a final rear wheel torque command may be determined by applying a filter for commands and performing backlash relief torque correction (Operation S9 in FIG. 4).

Thereafter, when the final front wheel torque command and the final rear wheel torque command are determined, the controller 20 is configured to control the front wheel motor 31 and the rear wheel motor 41 depending on the final front wheel torque command and the final rear wheel torque command.

Next, torque control in the state in which the controller 20 selects the responsiveness preferred mode (the backlash band evasion mode) and the vehicle enters the responsiveness preferred mode will be described. In Operation S2 in FIG. 4, when the vehicle is now in the state of entry to the responsiveness preferred mode, the controller 20 is configured to perform overall torque command profiling configured to determine the overall torque command based on requested torque to perform backlash band evasion control (Operation S3 in FIG. 4).

In the state of entry to the responsiveness preferred mode, the directions of torques output from the front wheel motor 31 and the rear wheel motor 41 and transmitted through the drive systems remain the same without being changed throughout all range of the requested torque, regardless of acceleration and deceleration situations of the vehicle.

At the present time, the front wheel torque command is always determined as a negative (−) torque value, the rear wheel torque command is always determined as a positive (+) torque value, and in the state of entry to the responsiveness preferred mode, the front wheel motor 31 continuously applies negative (−) torque to the front wheel-side drive system and the rear wheel motor 41 continuously applies positive (+) torque to the rear wheel-side drive system while driving of the vehicle.

In the responsiveness preferred mode, the front wheel torque command is determined as the negative (−) torque value, and the rear wheel torque command is determined as the positive (+) torque value, and a torque command acquired by summing the front wheel torque command and the rear wheel torque command is determined as a torque value which tracks the overall torque command finally determined by the controller 20 based on the requested torque.

In more detail, in a deceleration section in which the driver does not depress the accelerator pedal and thus the vehicle is decelerated, the overall torque command finally determined from the requested torque includes a negative (−) torque value as a regenerative torque command.

In the responsiveness preferred mode, even in a deceleration section in which the vehicle is decelerated, the rear wheel torque command is determined as a value equal to or greater than the minimum rear wheel torque threshold set to a positive (+) torque value, and the front wheel torque command is determined as a torque value (a negative torque value) obtained by subtracting the above-determined rear wheel torque command (the positive torque value) from the overall torque command (i.e., the negative torque value).

Referring to FIG. 4, the overall torque command obtained in Operation S3 is compared to the minimum rear wheel torque threshold in Operation S4, and when the overall torque command is equal to or less than the minimum rear wheel torque threshold, the controller 20 is configured to determine the rear wheel torque command as the minimum rear wheel torque threshold, and is configured to determine the front wheel torque command as the remaining value obtained by subtracting the minimum rear wheel torque threshold from the overall torque command to track the overall torque command in Operation S6.

The determined front wheel torque command includes a negative (−) torque value. Therefore, the rear wheel motor 41 outputs positive (+) torque and applies the torque to the rear wheel-side drive system, and the front wheel motor 31 outputs negative (−) torque and applies the torque to the front wheel-side drive system.

Thereafter, immediately when the driver depresses the accelerator pedal, the front wheel torque command may be determined as the maximum front wheel torque threshold set to a negative (−) torque value, and the rear wheel torque command is determined as a positive (+) torque value obtained by subtracting the above-determined front wheel torque command (the negative torque value) from the overall torque command (i.e., the positive torque value).

Furthermore, the overall torque command obtained in Operation S3 is compared to the maximum front wheel torque threshold in Operation S4, and when the overall torque command is greater than the maximum front wheel torque threshold, the controller 20 is configured to determine the front wheel torque command as the maximum front wheel torque threshold, and is configured to determine the rear wheel torque command as the remaining value obtained by subtracting the maximum front wheel torque threshold from the overall torque command to track the overall torque command in Operation S5.

Consequently, while the driver depresses the accelerator pedal, the front wheel motor 31 outputs negative (−) torque corresponding to the maximum front wheel torque threshold, and the rear wheel motor 41 outputs positive (+) torque obtained by subtracting the front wheel torque command (the negative torque) from the overall torque command (the positive torque).

Thereafter, when a tip-out maneuver of the accelerator pedal occurs, the rear wheel torque command is again determined as the minimum rear wheel torque threshold, and the front wheel torque command is determined as a negative (−) torque value obtained by subtracting the rear wheel torque command (the positive torque value) from the overall torque command (the negative torque value) which is regenerative torque.

Accordingly, even in the responsiveness preferred mode (the backlash band evasion mode), determination of the front wheel torque command and the rear wheel torque command to satisfy the overall torque command is similar to in the output preferred mode (the general mode).

When the front wheel torque command and the rear wheel torque command are determined in Operation S5 or S6 in FIG. 4, the controller 20 is configured to control operation of the front wheel motor 31 and the rear wheel motor 41 depending on the front wheel torque command and the rear wheel torque command (Operation S10).

Accordingly, in the state in which the responsiveness preferred mode is selected and the vehicle enters the responsiveness preferred mode, backlash band evasion control in which both the front wheel torque and the rear wheel torque do not pass through the corresponding backlash bands, i.e., torque ranges in which backlash may occur, is executed.

Consequently, in the responsiveness preferred mode, the directions of the front wheel torque and the rear wheel torque are not changed reversely while driving of the vehicle, and thus, problems caused by backlash do not occur. Furthermore, as shown in FIG. 5B, the vehicle may be accelerated immediately when the driver depresses the accelerator pedal, and thus, acceleration and deceleration responsiveness of the vehicle may be improved.

The minimum rear wheel torque threshold and the maximum front wheel torque threshold are values including offsets from 0, and may be commonly called "offset torques" in an exemplary embodiment of the present disclosure.

In setting the offset torques, in the case of the front torque, an offset in a regenerative braking direction should be set, and in case of the rear torque, an offset in a driving direction should be set, based on a torque set strategy in throttle balancing assistance control.

Although offsets stated in the following description will be expressed as positive (+) values, the maximum front wheel torque threshold (the negative value) is set to a value obtained by subtracting the corresponding offset torque from 0, and the minimum rear wheel torque threshold (the positive value) is set to a value obtained by adding the corresponding offset torque to 0.

The offset torques expressed as positive (+) values may be absolute values of the maximum front wheel torque threshold and the minimum rear wheel torque threshold. In the following description, the absolute value of the maximum front wheel torque threshold relating to the front torque is the offset torque of the maximum front wheel torque threshold. Furthermore, the maximum front wheel torque threshold is obtained by multiplying the offset torque thereof by "−1", and the minimum rear wheel torque threshold is obtained by multiplying the offset torque thereof by "+1".

The torque control method according to an exemplary embodiment of the present disclosure includes a method of varying offset torques set to evade backlash bands by the controller 20 to effectively prevent backlash shock and deterioration of driving efficiency.

In various exemplary embodiments of the present disclosure, the offset torques are varied depending on the vehicle driving information, more concretely, drive system state information, and the offset torques varied depending on the drive system state information are used to determine the front wheel torque command and the rear wheel torque command.

Inertia and stiffness of the drive systems have influence on the vehicle while driving of the vehicle, and thus, shock on the drive systems due to backlash may occur although the front wheel torque (command) maintains the maximum front wheel torque threshold (the negative value) or less and the rear wheel torque (command) maintains the minimum rear wheel torque threshold (the positive value) or more.

Therefore, only when the offset torques (in the case of the maximum front wheel torque threshold, the absolute value thereof) are sufficiently large, backlash shock may be firmly prevented. However, the meaning that the offset torques are sufficiently large indicates that the front wheel torque and the rear wheel torque counterpose respective forces.

This may cause driving efficiency reduction and behavioral stability deterioration of the vehicle in a low torque area. Therefore, to solve the above trade-off, the offset torques should be varied depending on the situations.

Furthermore, the variable offset torque may be applied to one of the front wheel torque command and the rear wheel torque command or both thereof. When the overall torque command (i.e., a requested torque command) is a condition that a torque value in the current cycle (for example, time step) is the same as a torque value in the previous time step, although the offset torque(s) is/are changed compared to the previous time step, the sum of the front wheel torque command and the rear wheel torque command determined by the changed offset torque(s) may be maintained at the same value as before.

Furthermore, the sum of the front wheel torque command and the rear wheel torque command to which offset torques are applied may be maintained at the same value as the sum (i.e., the overall torque command or the torque command before distribution) of the front wheel torque command and the rear wheel torque command to which no offset torques are applied.

For the present purpose, correction by an offset torque may be applied to both the front wheel torque command and the rear wheel torque command. Here, the term "correction" indicates correction of the front wheel torque command and the rear wheel torque command using respective torque thresholds set depending on offset torque values thereof. That is, such correction refers to determination of the front wheel torque command as the value of the maximum front wheel torque threshold, or determination of the rear wheel torque command as the value of the minimum rear wheel torque threshold.

Otherwise, correction by an offset torque may be applied only to the front wheel torque command, and the rear wheel torque command may be determined as a difference between the overall torque command (the total torque command) and the front wheel torque command corrected by the offset torque.

Alternatively, correction by an offset torque may be applied only to the rear wheel torque command, and the front wheel torque command may be determined as a difference between the overall torque command (the total torque command) and the front wheel torque command corrected by the offset torque.

The total torque value, i.e., the sum total of the torques of the front wheel torque command and the rear wheel torque command, after application of the offset torques through the above method may remain the same as the previous total torque value.

Furthermore, in an exemplary embodiment of the present disclosure, the offset torque for the front wheel torque command and the offset torque for the rear wheel torque command may be determined, respectively. Furthermore, the offset torque for the front wheel torque command and the offset torque for the rear wheel torque command may include the same value or different values.

When the offset torque for the front wheel torque command and the offset torque for the rear wheel torque command include the same value, the torque directions of the maximum front wheel torque threshold and the minimum rear wheel torque threshold are opposite (being expressed as "+" and "−"), but the absolute values of the two thresholds may be the same. Of course, when the offset torque for the front wheel torque command and the offset torque for the rear wheel torque command have different values, the torque directions of the maximum front wheel torque threshold and the minimum rear wheel torque threshold are opposite (being expressed as "+" and "−"), and the magnitudes (the absolute values) of the two thresholds are also different.

Hereinafter, determination of the offset torques will be described in more detail.

Figure 6:
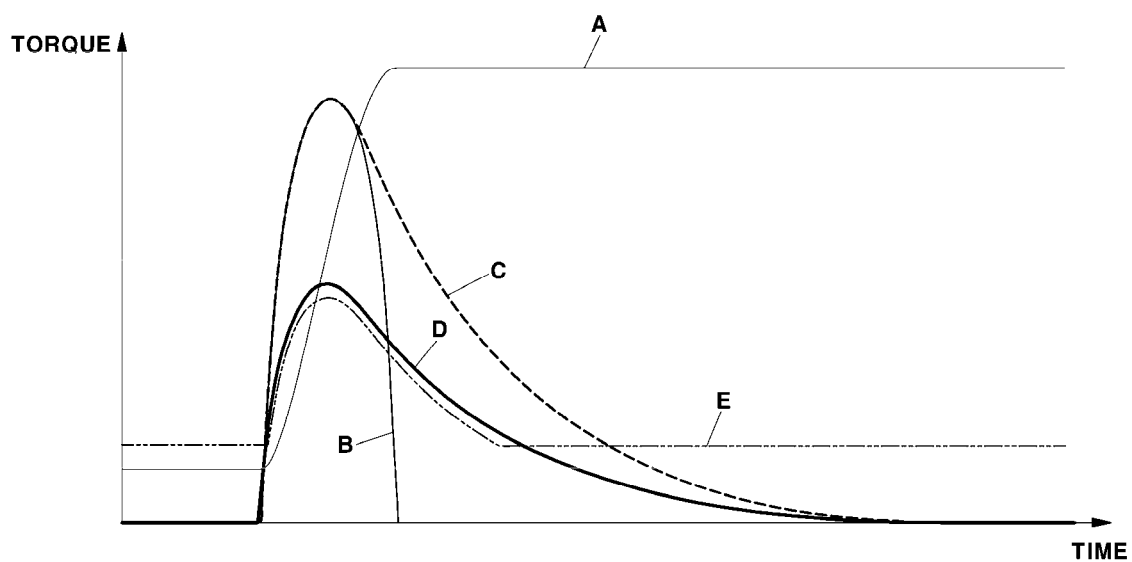
FIG. 6 is a graph representing one example of a method of determining an offset torque which is a variable value according to an exemplary embodiment of the present disclosure.

FIG. 6 is a graph representing one example of a method of determining offset torque which is a variable value according to various exemplary embodiments of the present disclosure.

First, in the first method of determining the offset torque by the controller 20, the offset torque may be a value which is varied depending on the state of the corresponding drive system. That is, the offset torque may be determined as a value corresponding to the current state of the drive system.

Concretely, real-time drive system state information to determine the offset torque may include input torque, and in the instant case, the input torque applied from the motor, which is a driving device to drive the vehicle, to the drive system may be used to determine the offset torque. The offset torque may be determined as a value varied to correspond to the input torque.

Here, as shown in FIG. 6, a variable offset torque value to prevent backlash in consideration of characteristics of a general drive system may be determined using only the input torque.

In an exemplary embodiment of the present disclosure, the input torque which is driving system state information to determine the offset torque may be information representing the driving state of the vehicle, i.e., vehicle driving information, or may be determined from the vehicle driving information.

In an exemplary embodiment of the present disclosure, the input torque indicates the torque of a main torque source which generates torque to drive the vehicle and applies the torque to the drive system, and a command value may be used as the input torque.

Here, the main torque source may be the driving device 41 to drive the vehicle, the driving device 41 in the electric vehicle is mainly a motor, and therefore, the command may be an input torque command which is a motor torque command (a final torque command).

The input torque may be the above-described overall torque command determined based on the driving state of the vehicle. When the overall torque command is used as the input torque, an offset torque for a front wheel torque command and an offset torque for a rear wheel torque command may include the same value, and in the instant case, the torque directions of the maximum front wheel torque threshold and the minimum rear wheel torque threshold may be opposite, but the absolute values of the two thresholds may be the same.

Otherwise, a front wheel torque command and a rear wheel torque command obtained by distributing the overall torque command through the conventional front and rear wheel torque distribution process based on a front and rear wheel distribution ratio may be used as respective input torques.

For example, the distributed front wheel torque command as the input torque may be used to determine an offset torque for the front wheel torque command and a maximum front wheel torque threshold, and the distributed rear wheel torque command as the input torque may be used to determine an offset torque for the rear wheel torque command and a minimum rear wheel torque threshold.

Otherwise, the input torque may be an estimated input torque value obtained by a motor control unit (MCU) rather than the above-described command value. Alternatively, the input torque may be a detected motor torque value obtained by a torque sensor. Here, the detected motor torque value may be a detected value of the torque sensor provided at the input side of a drive system gear, such as a reducer, or the output side of a motor. Otherwise, the input torque may be a value obtained by additionally applying a filter.

In general, when the input torque is changed suddenly, torsion or shock occurs in the drive system. Furthermore, there is a limit to a torque slope (change rate) set to be implementable in the Power Electric (PE) system of an electric vehicle including a motor, an inverter, a reducer, and the like, or set in consideration of physical limitations, and thereby, actually generated torque may invade a backlash shock inducing area due to suddenly change in the torque.

Therefore, in view of the above points, the slope (the change rate) of the input torque may be used to determine the offset torque which is a value varied depending on the input torque, and in the instant case, a combination value of a derivative of the input torque, which indicates the slope of the input torque, may be used. For example, a value proportional to the derivative of the input torque may be used to determine the offset torque. In the following description, the value proportional to the derivative of the input torque may be defined as a value obtained by multiplying the derivative of the input torque by a predetermined coefficient of proportionality.

That is, the value proportional to the derivative of the input torque may be set, and the offset torque may be varied using the above value as input thereof, or the offset torque, which is a variable value, may be determined in the form of a transfer function using the input torque as input.

In more detail, an offset torque value may be determined using the derivative of the input torque indicating the slope (being an absolute value) of the input torque, and in the instant case, the offset torque value may be determined from a value proportional to the derivative of the input torque.

Here, a final offset torque value may be determined by multiplying the offset torque, obtained using the value proportional to the derivative of the input torque as input, by a predetermined gain, and applying a floor value to a value obtained by multiplying the offset torque by the gain or summing the value obtained by multiplying the offset torque by the gain and a minimum value indicating minimum offset torque.

Furthermore, in use of the value proportional to the derivative of the input torque, a forgetting factor which decays as time passes may be applied to the offset torque value determined from the value proportional to the derivative of the input torque which indicates the slope of the input torque, and a value obtained by applying the forgetting factor to the offset torque value may be multiplied by the gain. Here, the forgetting factor including a value which is greater than 0 but less than 1 may be used.

As the offset torque value to which the forgetting factor is applied, the maximum value between the value proportional to the derivative of the input torque, which is the input offset torque value, and a value which decays by applying the forgetting factor thereto in the previous time step may be used, and thereby, the variable offset torque value may be set to be rapidly increased but to be slowly decreased.

Figure 7:
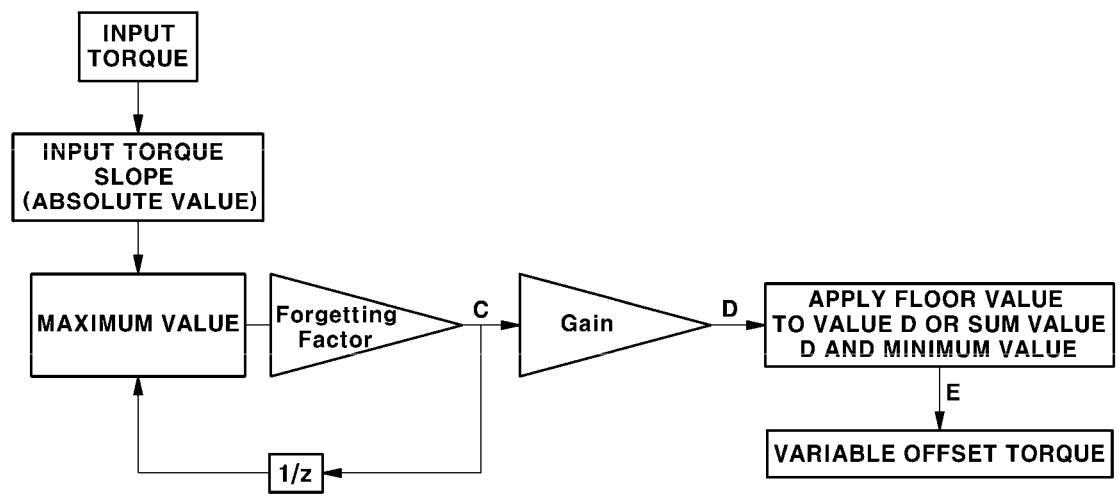
FIG. 7 is a block diagram showing values A to E of FIG. 6.

FIG. 7 is a block diagram showing values A to E of FIG. 6. "A" indicates the input torque value, and "B" indicates the combination value of the derivative of the input torque indicating the slope of the input torque.

Furthermore, "C" indicates the value obtained by applying the forgetting factor to the maximum value between the combination value of the derivative of the input torque determined in the current time step and the value determined by applying the forgetting factor in the previous time step.

In FIG. 7, "D" indicates the value obtained by multiplying the value, obtained by applying the forgetting factor to the maximum value, by the gain. "E" indicates the finally obtained offset torque value by applying a floor value to the value, obtained by multiplying the value, obtained by applying the forgetting factor to the maximum value, by the gain, or summing the value, obtained by multiplying the value, obtained by applying the forgetting factor to the maximum value, by the gain, and the minimum value.

In an exemplary embodiment of the present disclosure, the controller 20 is configured to determine the minimum rear wheel torque threshold and the maximum front wheel torque threshold using offset torques which are finally obtained in the above-described manner, and utilizes the determined minimum rear wheel torque threshold and maximum front wheel torque threshold to determine the front wheel torque command and the rear wheel torque command.

As another method of determining offset torque, the controller 20 may be configured to determine the offset torque using a backlash value and a shaft torsion value which are drive system state information, and in the instant case, the backlash value and the shaft torsion value may be determined using a rotation speed difference value of the drive system.

That is, in an exemplary embodiment of the present disclosure, the drive system state information to determine the offset torque may include backlash information in the drive system and shaft torsion information in the drive system, and these pieces of information may be obtained from the rotation speed difference of the drive system.

Furthermore, when the backlash value and the shaft torsion value are obtained from the rotation speed difference of the drive system, the offset torque value may be varied to a value corresponding to the backlash value and the shaft torsion value. In the following description, the backlash value is defined as a backlash speed, and the shaft torsion value is defined as a shaft torsional speed.

In an exemplary embodiment of the present disclosure, the backlash speed and the shaft torsional speed to determine the offset torque may be determined by the controller 20 based on a difference between measured speeds in the drive system. Thereafter, the controller 20 may be configured to determine the offset torque using the determined backlash speed and shaft torsional speed.

As described above, the backlash speed and the shaft torsional speed may be determined between the measured speeds in the drive system (referred to as "drive system speeds"), and in the instant case, the backlash speed and the shaft torsional speed may be determined from a difference between two speeds measured at one side and the other side of the drive speed (referred to as "a drive system rotation speed difference"). Here, the drive system may be one selected from the front wheel-side drive system and the rear wheel-side drive system.

In the drive system of the vehicle, there are drive system speed information corresponding to an upstream side and drive system speed information corresponding to a downstream side based on a gear element, such as the reducer 32 or 42, in the drive system on a path for transmitting the driving force and torque of the motor 31 or 41 serving as the driving device to the driving wheels 33 or 43, and when there is a difference between the upstream-side drive system speed and the downstream-side system speed (referred to as "a drive system rotation speed difference), the offset torque may be determined using such a difference.

Here, the difference between the upstream-side drive system speed and the downstream-side system speed may be a difference between, when the drive system speed at one side (for example, at the downstream side) is converted into a speed at the other side (for example, at the upstream side) in the drive system using a gear ratio, the converted driving system speed and an actual speed at the other side.

Here, the drive system speed at one side converted into the speed at the other side may be a speed equivalent to the drive system speed at the other side, and hereinafter a difference between the drive system speeds at both sides will be referred to as "the drive system rotation speed difference".

Under the assumption that the gear ratio is not changed in the drive system of the vehicle (i.e., when there is no gear shifting), there are two major causes for generation of the drive system rotation speed difference, that is, the first cause is backlash in the drive system, and the second cause is shaft torsional compliance in the drive system.

Therefore, the backlash speed and the shaft torsional speed may be determined from the drive system rotation speed difference, and the offset torque value may be determined and varied using the determined backlash speed and shaft torsional speed.

Here, the offset torque value may be obtained by summing values obtained by multiplying the absolute values of the backlash speed and the shaft torsional speed by respective predetermined coefficients (weights).

Hereinafter, a method of determining the backlash speed and the shaft torsional speed will be described in detail.

For example, when the drive system speed at one side, which is the drive system speed at the downstream side, is a driving wheel speed detected by a wheel speed sensor among the sensors 11 (i.e., a measured wheel speed), and the drive system speed at the other side, which is the drive system speed at the upstream side, is a motor speed detected by a resolver among the sensors 11 (i.e., a measured motor speed), the drive system rotation speed difference may be a difference between the above-detected actual motor speed and an equivalent wheel speed.

Here, the equivalent wheel speed is a speed from the standpoint of the motor, which converted from the detected driving wheel speed (i.e., the measured wheel speed), using a gear ratio between the motor and the driving wheel. That is, the equivalent wheel speed is a speed at the motor which is converted from the measured wheel speed and is a wheel speed equivalent to the motor speed.

When the equivalent wheel speed is determined, the drive system rotation speed difference, which is the difference between the motor speed (i.e., the measured motor speed), which is the drive system speed at the upstream side, and the equivalent wheel speed, which is the drive system speed at the downstream side, may be determined.

In an exemplary embodiment of the present disclosure, the shaft torsional speed may be determined from the determined drive system rotation speed difference, and drive system spring stiffness may be determined through determination processes by equations using the drive system rotation speed difference and a motor torque command, and the shaft torsional speed may be determined from the determined drive system spring stiffness and the motor torque command.

The shaft torsional speed becomes drive system shaft torsion information to determine the offset torque, and in various exemplary embodiments of the present disclosure, both the shaft torsional speed and the backlash speed, which is drive system backlash information, may be used to determine the offset torque.

The shaft torsional speed may be determined as a value obtained by multiplying the drive system spring stiffness by the motor torque command, and the motor torque command may be the overall torque command determined by the controller 20. Determination of the overall torque command by the controller 20 has been described above.

Furthermore, the drive system backlash information used to determine the offset torque may include the backlash speed, and the backlash speed may be determined based on the drive system rotation speed difference and the shaft torsional speed.

In various exemplary embodiments of the present disclosure, the backlash speed may be determined as a difference between the drive system rotation speed difference and the shaft torsional speed, and concretely, may be determined as a value obtained by subtracting the shaft torsional speed from the drive system rotation speed difference.

In various exemplary embodiments of the present disclosure, the backlash speed may be determined as a value obtained by filtering the value, obtained by subtracting the shaft torsional speed from the drive system rotation speed difference. Here, filtering may be performed by a high-pass filter, and the backlash speed may be obtained by high-pass filtering the value obtained by subtracting the shaft torsional speed from the drive system rotation speed difference.

Furthermore, the controller 20 may be configured to determine whether or not backlash occurs by comparing the determined backlash speed to a set backlash determination threshold, and may be configured to generate a backlash flag indicating whether or not backlash occurs depending on a result of determination.

Equation 1 below is an equation to determine the drive system rotation speed difference.

$$\omega_d = \omega_m - \omega_w^* \qquad \text{[Equation 1]}$$

Here, $\omega_m$ indicates the motor speed detected by the resolver among the sensors 11, and $\omega_w^*$ indicates the equivalent wheel speed which is converted from the wheel speed detected by the wheel speed sensor among the sensors 11 using the gear ratio. Furthermore, $\omega_d$ indicates the drive system rotation speed difference which is a difference between the motor speed and the equivalent wheel speed.

When the drive system rotation speed difference is obtained, a spring stiffness value of the drive system is determined based on the drive system rotation speed difference $\omega_d$ and motor torque command information, and the shaft torsional speed of the drive system is determined based on the determined spring stiffness value of the drive system and the motor torque command (basic torque command) information.

Equation 2 below is an equation which may be used to estimate and determine the spring stiffness value of the drive system using the drive system rotation speed difference and the motor torque command information, and Equation 3 below is an equation which may be used to determine a shaft torsional speed value using the estimated drive system spring stiffness and the motor torque command information.

That is, through determination processes using Equation 2 and Equation 3, drive system spring stiffness information may be acquired from the drive system rotation speed difference and the motor torque command (the overall torque command), and the shaft torsional speed value may be determined from the acquired drive system spring stiffness information and the motor torque command.

$$\dot{\hat{k}}_{spr} = \text{deadzone}\left(K_u \times (1 - \text{Flag}_{backlash}) \times \left(\omega_d - \hat{k}_{spr} \times \dot{T}_{cmd}\right)\right) \quad \text{[Equation 2]}$$

$$\hat{\omega}_d = \hat{k}_{spr} \times \dot{T}_{cmd} \quad \text{[Equation 3]}$$

In Equations 2 and 3, ^ indicates an estimated value, and · indicates a differential value.

In Equation 2, $K_u$ indicates an update gain which includes a predetermined value, and the update gain including a proper value to distinguish backlash from normal torsion due to application of torque is predetermined.

Furthermore, $\text{Flag}_{backlash}$ indicates the backlash flag, that is, a backlash flag value which is finally determined in the previous determination cycle as feedback information, and may be determined as a value of 1 or 0 by Equation 7 which will be described below.

Furthermore, $\hat{k}_{spr}$ indicates a spring stiffness value (i.e., an estimated value) target to be obtained, i.e., the drive system spring stiffness used to determine the shaft torsional speed, and $T_{cmd}$ indicates the motor torque command.

In Equation 2, deadzone (x) is a dead zone function which includes an output of 0 when x is within a predetermined range called a deadband, and includes an output corresponding to x only when x deviates from the deadband.

Furthermore, in Equation, $\hat{\omega}_d$ indicates a shaft torsional speed (i.e., an estimated value) desired to be obtained.

Use of the drive system spring stiffness value to determine the shaft torsional speed has been described with reference to Equations 2 and 3, and although such a drive system spring stiffness value is updated with a new value by repetitively determining the drive system spring stiffness value for each backlash determination cycle through the same method, a change amount of the spring stiffness may be updated rather than updating the drive system spring stiffness value.

In the instant case, Equations 2 and 3 may be replaced by Equations 4 and 5 below.

$$\dot{\tilde{k}}_{spr} = \quad \text{[Equation 4]}$$
$$\text{deadzone}\left(K_u \times (1 - \text{Flag}_{backlash}) \times \left(\omega_d - \left(\overline{k}_{spr} + \tilde{k}_{spr}\right) \times \dot{T}_{cmd}\right)\right)$$

$$\hat{\omega}_d = \left(\overline{k}_{spr} + \tilde{k}_{spr}\right) \times \dot{T}_{cmd} \quad \text{[Equation 5]}$$

In Equations 4 and 5, $\overline{k}_{spr} + \tilde{k}_{spr}$ indicates the drive system spring stiffness, and in the instant case, $\overline{k}_{spr}$ is a constant, and $\tilde{k}_{spr}$ indicates the change amount of the spring stiffness which is substantially determined per determination cycle to be updated.

Subsequently, the backlash speed may be determined using the drive system rotation speed difference and the shaft torsional speed, and whether or not backlash occurs may be determined from the determined backlash speed.

Equation 6 below is an equation which may be used to determine the backlash speed using the drive system rotation speed difference $\omega_d$ and the shaft torsional speed $\hat{\omega}_d$. Furthermore, Equation 7 below is an equation which may define a method of determining occurrence of backlash from the backlash speed.

$$\varepsilon = HPF(\omega_d - \hat{\omega}_d) \quad \text{[Equation 6]}$$

$$\text{Flag}_{backlash} = \begin{cases} 1, & \text{when } \varepsilon > \varepsilon_{threshold} \\ 0, & \text{when } \varepsilon \leq \varepsilon_{threshold} \end{cases} \quad \text{[Equation 7]}$$

In Equation 6, $\varepsilon$ indicates the backlash speed, and in an exemplary embodiment of the present disclosure, the backlash speed $\varepsilon$ is defined as a value obtained by subtracting the shaft torsional speed $\hat{\omega}_d$ from the drive system rotation speed difference $\omega_d$, as shown in Equation 6.

In an exemplary embodiment of the present disclosure, the backlash speed $\varepsilon$ may be defined as a value obtained by filtering the value obtained by subtracting the shaft torsional speed $\hat{\omega}_d$ from the drive system rotation speed difference $\omega_d$, and HPF (x) in Equation 6 is a filtering function indicating a filtered value of x, more concretely, a filtering function indicating a high-pass filtered value of x.

In Equation 6, the drive system rotation speed difference $\omega_d$ is a difference value between the motor speed $\omega_m$ and the equivalent wheel speed $\omega_w^*$ determined by the controller 20 based on Equation 1, and the shaft torsional speed $\hat{\omega}_d$ determined by the controller 20 based on Equation 3 and the drive system rotation speed difference $\omega_d$ are used to determine the backlash speed $\varepsilon$.

In Equation 7, $\varepsilon_{threshold}$ indicates a backlash determination threshold which is a predetermined value in a virtual effect production controller 22 of the controller 20 to determine whether or not backlash occurs from the backlash speed $\varepsilon$ determined in Equation 6. Furthermore, in Equation 7, $\text{Flag}_{backlash}$ is the backlash flag indicating whether or not backlash occurs as a result of backlash determination.

As shown in Equation 7, the controller 20 is configured to determine that backlash occurs, when the backlash speed $\varepsilon$ exceeds the backlash determination threshold $\varepsilon_{threshold}$, and generates and outputs a value of 1 indicating a backlash occurrence section, as the value of the backlash flag $\text{Flag}_{backlash}$.

On the other hand, the controller 20 is configured to determine that backlash does not occur, when the backlash speed $\varepsilon$ is equal to or less than the backlash determination threshold $\varepsilon_{threshold}$, and generates and outputs a value of 0 indicating a backlash non-occurrence section as the value of the backlash flag $\text{Flag}_{backlash}$.

Accordingly, in an exemplary embodiment of the present disclosure, a section in which the backlash speed $\varepsilon$ defined in Equation 6 is greater than a designated value (the backlash determination threshold) may be determined as the backlash section. That is, in an exemplary embodiment of the present disclosure, detection and determination of backlash may be performed through determination processes using Equations 1 to 7.

Figure 8:
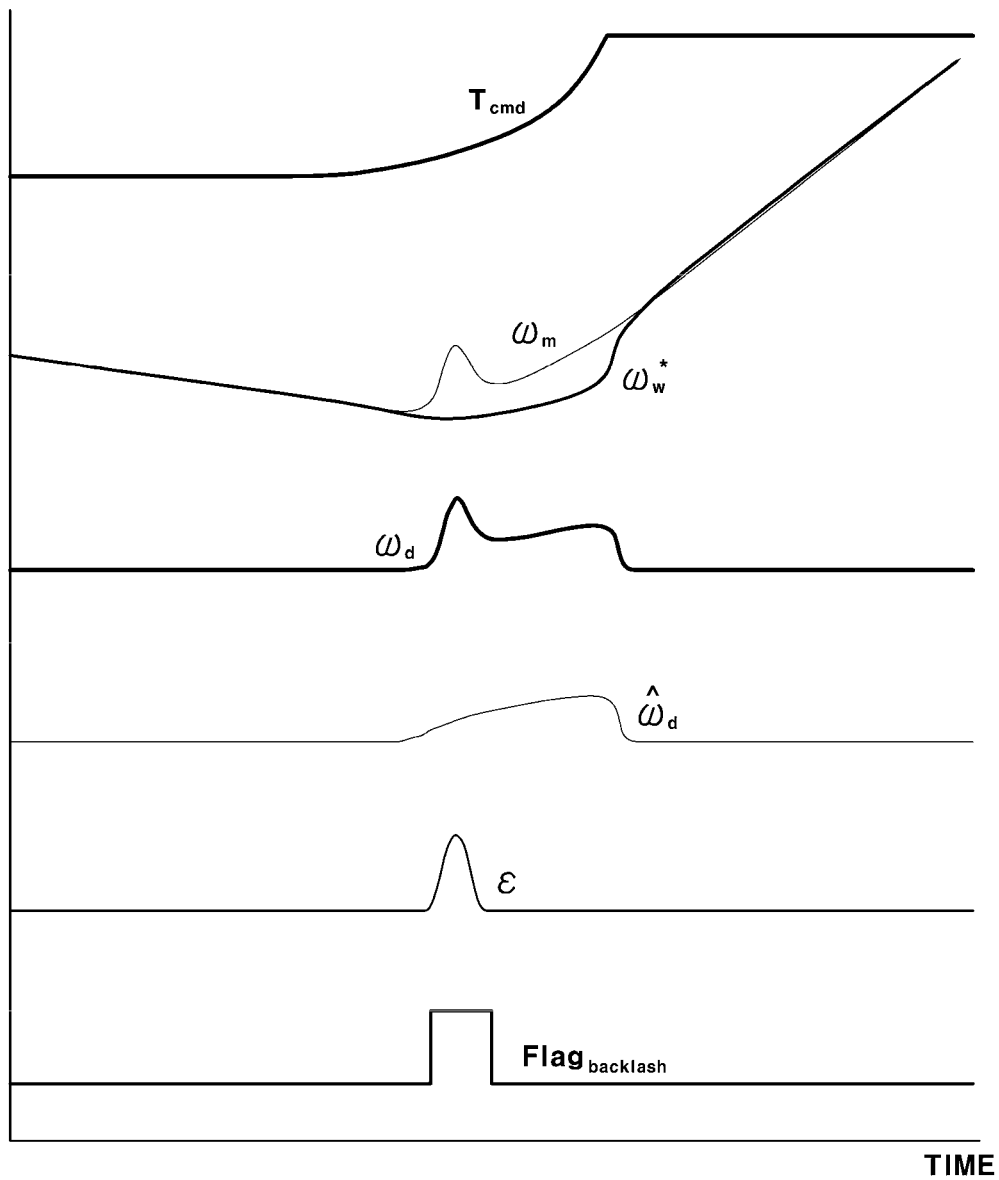
FIG. 8 is a graph illustrating variables to determine a shaft torsional speed and a backlash speed, determined values thereof, and a state of generation of a backlash flag according to an exemplary embodiment of the present disclosure.

Referring to FIG. 8, in various exemplary embodiments of the present disclosure, variables to determine the shaft torsional speed and the backlash speed, determined values thereof, and a backlash flag occurrence state are illustrated. FIG. 8 illustrates an example of the motor torque command $T_{cmd}$, the motor speed $\omega_m$ which is a detected speed, and the equivalent wheel speed $\omega_w^*$ determined from the wheel speed $\omega_m$.

Furthermore, FIG. 8 illustrates an example of the drive system rotation speed difference $\omega_d$ which is a difference value between the motor speed $\omega_m$ and the equivalent wheel speed $\omega_w^*$, the shaft torsional speed $\hat{\omega}_d$ determined based on the drive system rotation speed difference $\omega_d$ and the motor torque command $T_{cmd}$, and the backlash speed $\varepsilon$ determined from a difference value between the drive system rotation speed difference $\omega_d$ and the shaft torsional speed $\hat{\omega}_d$.

Furthermore, FIG. 8 illustrates the backlash flag Flag$_{backlash}$ as a result of drive system backlash determination, and as described above, the value of the backlash flag Flag$_{backlash}$ is determined as the value of 0 or 1 by comparing the backlash speed $\varepsilon$ with the backlash determination threshold $\varepsilon_{threshold}$.

As another method of determining the offset torque, a method of using a drive system model using the drive system state information as input thereof is suggested. That is, the offset torque may be varied using the drive system model. Here, the drive system state information may include input torque, a rotation speed of the input unit of the drive system, and a rotation speed of the output unit of the drive system.

Figure 9:
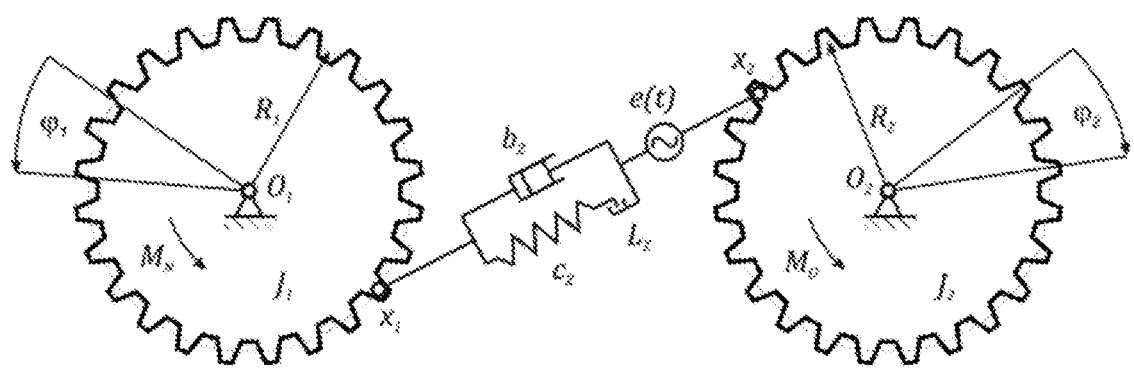
FIG. 9 is a view exemplarily illustrating one example of a drive system gear model according to an exemplary embodiment of the present disclosure.

FIG. 9 is a view exemplarily illustrating one example of a drive system gear model according to an exemplary embodiment of the present disclosure [Prajapat, Ganesh P., N. Senroy, and I. N. Kar. "Modeling and impact of gear train backlash on performance of DFIG wind turbine system." Electric Power Systems Research 163 (2018): 356-364.].

Figure 10:
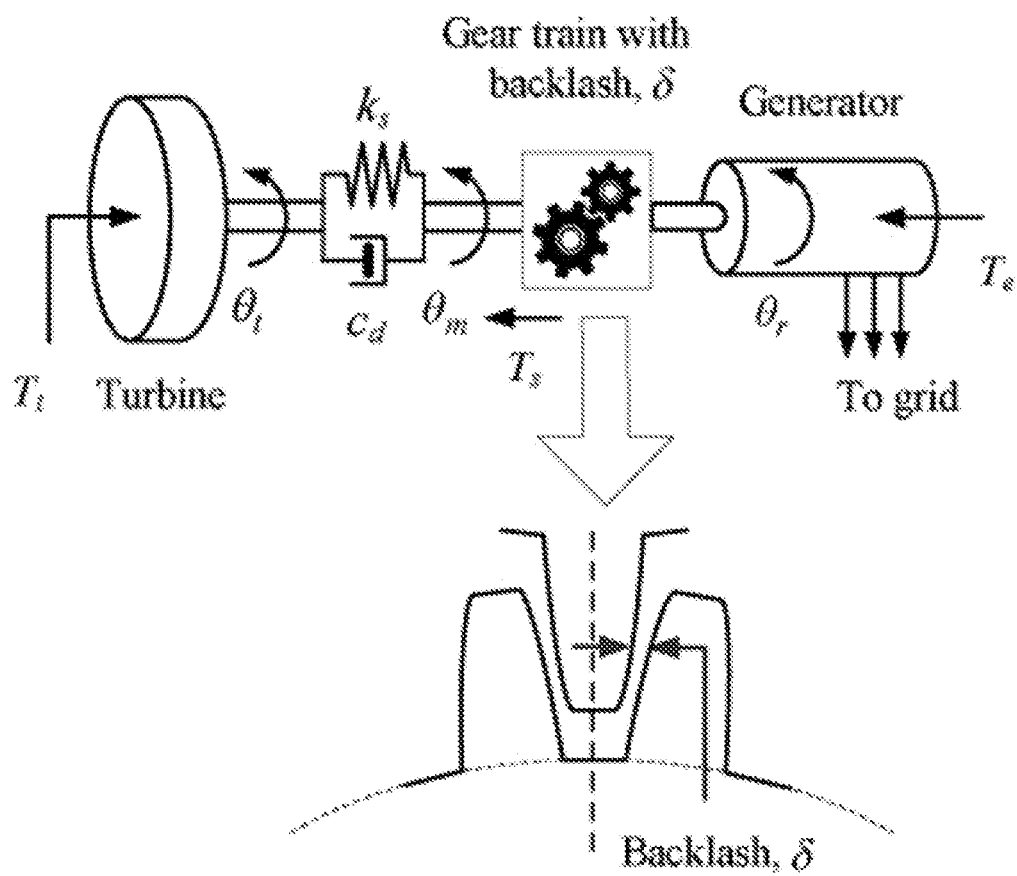
FIG. 10 is a view exemplarily illustrating a driveshaft torsion model according to an exemplary embodiment of the present disclosure.

FIG. 10 is a view exemplarily illustrating a driveshaft torsion model according to an exemplary embodiment of the present disclosure [Margielewicz, Jerzy, Damian Gaska, and Grzegorz Litak. "Modeling of the gear backlash." Nonlinear Dynamics 97.1 (2019): 355-368.].

In an exemplary embodiment of the present disclosure, the drive system gear model shown in FIG. 9 or the driveshaft torsion model shown in FIG. 10 may be used as the drive system model to determine a transmission torque which is the output torque, from the input torque. In the drive system model, stiffness or damping existing between connections of gears, and backlash existing therebetween are considered, as shown in FIG. 9 and FIG. 10.

Transmission torque, which is transmitted between gears, may be estimated using information, such as the input torque command (the motor torque command), the rotation speed of the input unit of the drive system, and the rotation speed of the output unit of the drive system, based on the drive system model, and the offset torque to secure drivability may be determined based on the estimated transmission torque.

Here, the transmission torque, which is the drive system model-based output torque, may be determined from the current input torque using the drive system model of the vehicle set to include the gear model.

Because transmitted torque is generally expressed in a form of a differential equation, the slope of the transmission torque may be easily determined, and the offset torque may be determined by summing values obtained by applying predetermined weights to the transmission torque and the slope thereof, respectively.

Otherwise, in the method described with reference to FIG. 6, the offset torque may be determined by replacing the input torque and the slope thereof with the transmission torque, which is the output torque of a transmission torque model equation, and the slope thereof.

Figure 11:
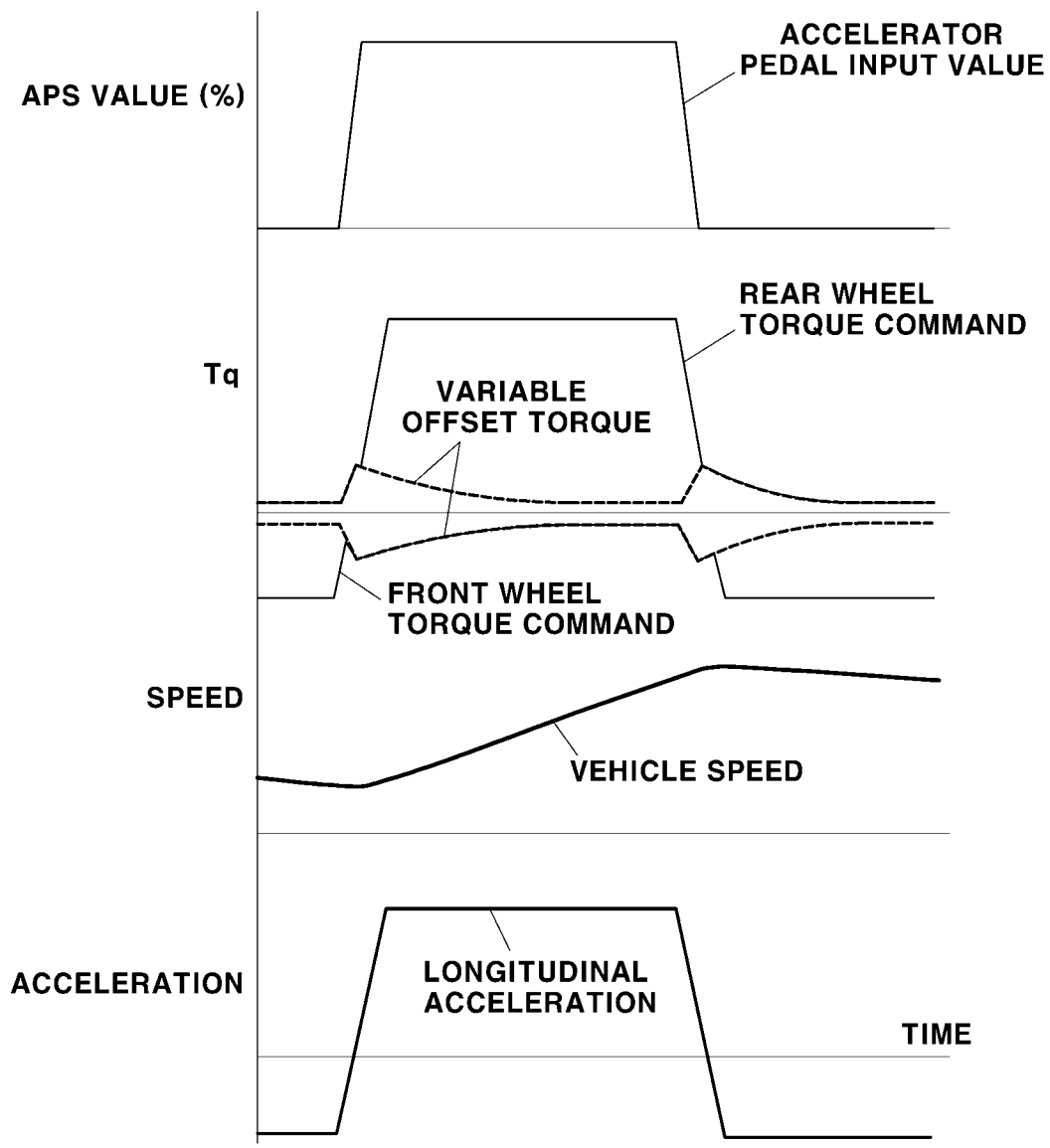
FIG. 11 is a graph illustrating a variable state of offset torques according to one example of the present disclosure.
Figure 12:
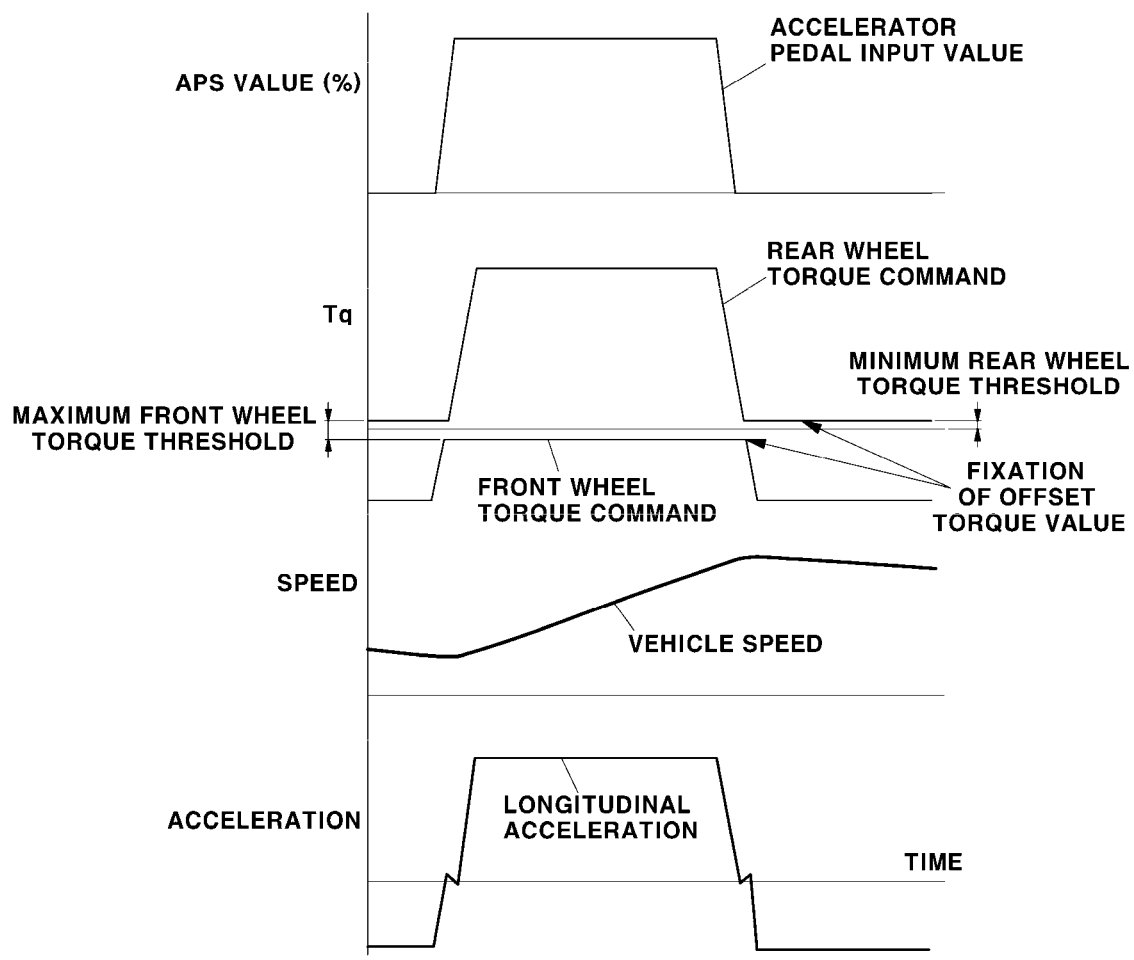
FIG. 12 is a graph illustrating a comparative example in which offset torques are fixed.

FIG. 11 is a graph illustrating a variable state of the offset torque according to one example of the present disclosure, and FIG. 12 is a graph illustrating a comparative example in which the offset torque is fixed.

As shown in FIG. 11, according to one example of the present disclosure, it may be confirmed that the offset torque values, i.e., the minimum rear wheel torque threshold and the maximum front wheel torque threshold, are determined as variable values rather than fixed values.

Referring to FIG. 11, it may be confirmed that the front wheel torque command is limited by the variable offset torque value, i.e., the variable maximum front wheel torque threshold. In one example shown in FIG. 11, the front wheel torque command is determined as the maximum front wheel torque threshold.

In the example shown in FIG. 11, because the vehicle is in the state in which there is accelerator pedal input by the driver, according to the general torque distribution process performed based on the conventional front and rear wheel distribution ratio, not only the rear wheel torque command but also the front wheel torque command should be determined as a positive (+) torque value, but the front wheel torque command is determined as a torque value of equal to or less than the maximum front wheel torque threshold, which is a variable offset torque value.

Here, the front wheel torque command does not pass through the backlash band, and is always determined as a negative (−) torque value. On the other hand, the rear wheel torque command is determined as a positive (+) torque value to satisfy the overall torque command depending on requested torque through the sum of the rear wheel torque command and the front wheel torque command.

Because the front wheel torque command does not pass through the backlash band, the rear torque command may be generated to track the target overall torque command from the beginning of accelerator pedal input, and therefore, vehicle responsiveness to driving input by the driver may be improved.

Compared to the comparative example shown in FIG. 12, if the variable offset torque values are used, when the accelerator pedal is depressed or released, generation of the longitudinal acceleration of the vehicle, which is increased or decreased steadily without generating an impact or a jerk in vehicle behavior may be induced.

However, in the comparative example shown in FIG. 12, fixed values are used as offset torque values, i.e., the minimum rear wheel torque threshold and the maximum front wheel torque threshold. In the instant case, compared to the example shown in FIG. 11, although there is the same accelerator pedal input by the driver, when the accelerator pedal is depressed or released, the acceleration direction of the vehicle may fluctuate sharply, and thus, an impact or a jerk in vehicle behavior may occur.

In the above-described torque control method of the drive system according to an exemplary embodiment of the present disclosure, the motor is used only in a torque area irrelevant to backlash during execution of backlash band evasion control, and motor control for a high performance driving mode is performed, being capable of preventing occurrence of backlash itself.

Furthermore, vibration, noise and shock due to the backlash may be effectively solved, the turning performance of the vehicle may be improved, torque may be generated without causing backlash problems, and thereby, longitudinal responsiveness of the vehicle may be greatly improved.

Conventionally, backlash control configured to relieve shock due to the backlash is performed in a turning section even during performance-oriented driving, causes deterioration of vehicle torque responsiveness with respect to driver's input, and consequently results in increase in a lap time and deterioration in lateral safety of the vehicle, but the present disclosure may improve such conventional problems.

Furthermore, a driving mode only for high-performance electric vehicles in which a sense of direct connection is emphasized may be provided, convenience and accuracy in load transfer control during turning on a track may be improved, and ease of use of a special driving mode, such as a drift mode, may be improved.

As is apparent from the above description, in a torque control method of a drive system of an electric vehicle according to an exemplary embodiment of the present disclosure, a motor is used only in a torque area irrelevant to backlash during execution of backlash band evasion control, being capable of preventing occurrence of backlash itself.

Furthermore, vibration, noise and shock problems due to the backlash may be effectively solved, motor control for a high performance driving mode may be performed, the turning performance of the vehicle may be improved, torque may be generated without causing backlash problems, and thereby, longitudinal responsiveness of the vehicle may be greatly improved.

Furthermore, a driving mode only for high-performance electric vehicles in which a sense of direct connection is emphasized may be provided, convenience and accuracy in load transfer control during turning on a track may be improved, and ease of use of a special driving mode, such as a drift mode, may be improved.

in an exemplary embodiment of the present disclosure, variable offset torques, i.e., a maximum front wheel torque threshold and a minimum rear wheel torque threshold which are varied depending on the driving state of the vehicle, are used and thereby, generation of an impact or a jerk in the longitudinal behavior of the vehicle may be prevented when a driver depresses an accelerator pedal or releases the accelerator pedal.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A torque control method of a drive system of an electric vehicle, the method comprising:
determining, by a controller, an overall torque command based on a requested torque depending on a vehicle driving state; and
determining, by the controller, a front wheel torque command and a rear wheel torque command configured to track the overall torque command, in a state in which a responsiveness preferred mode, configured so that a front wheel torque control and a rear wheel torque control to evade respective backlash bands corresponding to torque areas of corresponding drive systems, in which backlash is capable of occurring, are performed, is selected,
wherein the front wheel torque command is determined as a value of being equal to or less than a maximum front wheel torque threshold set to a negative (−) torque value,
wherein the rear wheel torque command is determined as a value of equal to or greater than a minimum rear wheel torque threshold set to a positive (+) torque value, and
wherein when an absolute value of the maximum front wheel torque threshold, and the minimum rear wheel torque threshold are referred to as offset torques, the offset torques are values varied depending on drive system state information.

2. The torque control method of claim 1,
wherein the corresponding drive systems include a front wheel-side drive system and a rear wheel-side drive system,
wherein the maximum front wheel torque threshold is set to a value of less than a lower threshold of a backlash band corresponding to a torque area of the front wheel-side drive system, in which backlash is capable of occurring, and
wherein the minimum rear wheel torque threshold is set to a value of greater than an upper threshold of a backlash band corresponding to a torque area of the rear wheel-side drive system, in which backlash is capable of occurring.

3. The torque control method of claim 2, wherein each of the backlash band of the front wheel-side drive system and the backlash band of the rear wheel-side drive system is set to a torque range including boundaries defined by a lower threshold including a negative (−) value and an upper threshold including a positive (+) value, and including torque of zero.

4. The torque control method of claim 1, wherein, in the responsiveness preferred mode, the controller is configured to:
determine the rear wheel torque command as the minimum rear wheel torque threshold, in response that the overall torque command is equal to or less than the minimum rear wheel torque threshold by comparing the overall torque command to the minimum rear wheel torque threshold; and
determine the front wheel torque command as a value obtained by subtracting the determined rear wheel torque command from the overall torque command.

5. The torque control method of claim 1, wherein, in the responsiveness preferred mode, the controller is configured to:
determine the front wheel torque command as the maximum front wheel torque threshold, in response that the overall torque command is greater than the maximum front wheel torque threshold by comparing the overall torque command to the maximum front wheel torque threshold; and
determine the rear wheel torque command as a value obtained by subtracting the determined front wheel torque command from the overall torque command.

6. The torque control method of claim 1, wherein, in the responsiveness preferred mode, the front wheel torque command and the rear wheel torque command are determined so that a sum of the front wheel torque command and the rear wheel torque command tracks the overall torque command.

7. The torque control method of claim 1,
wherein a value obtained by multiplying a corresponding one of the offset torques varied depending on the drive system state information by −1 is used as the maximum front wheel torque threshold,
wherein the front wheel torque command is determined as the corresponding offset torque, and
wherein the rear wheel torque command is determined as a value obtained by subtracting the maximum front wheel torque threshold from the overall torque command.

8. The torque control method of claim 1,
wherein a corresponding one of the offset torques varied depending on the drive system state information is used as the minimum rear wheel torque threshold,
wherein the rear wheel torque command is determined as the corresponding offset torque, and
wherein the front wheel torque command is determined as a value obtained by subtracting the minimum rear wheel torque threshold from the overall torque command.

9. The torque control method of claim 1, wherein the drive system state information includes input torque applied to the drive system by a motor configured to drive the vehicle.

10. The torque control method of claim 9, wherein the input torque is a predetermined one of the overall torque command corresponding to a motor torque command, an estimated motor torque value estimated by a motor control unit, a detected motor torque value detected by a torque sensor, a value obtained by applying a filter to the overall torque command, a value obtained by applying a filter to the estimated motor torque value, and a value obtained by applying a filter to the detected motor torque value.

11. The torque control method of claim 9,
wherein the input torque includes the front wheel torque command and the rear wheel torque command distributed from the overall torque command depending on a front and rear wheel distribution ratio,
wherein the offset torque for the front wheel torque command and the maximum front wheel torque threshold are determined depending on the distributed front wheel torque command, and wherein the offset torque for the rear wheel torque command and the minimum rear wheel torque threshold are determined depending on the distributed rear wheel torque command.

12. The torque control method of claim 9, wherein a corresponding one of the offset torques configured to be the values varied depending on the drive system state information:

is determined, by the controller, based on a value proportional to a derivative of the input torque configured to indicate a slope of the input torque; or is determined, by the controller, based on a transfer function using the input torque as input thereof.

13. The torque control method of claim 12, wherein the controller is configured to:

determine a final offset torque by applying a forgetting factor, configured to include a value of greater than 0 but less than 1 and to decay as time passes, to the offset torque obtained from the value proportional to the derivative of the input torque, multiplying a value, obtained by applying the forgetting factor to the offset torque, by a predetermined gain, and applying a floor value to a value, obtained by multiplying the value, obtained by applying the forgetting factor to the offset torque, by the predetermined gain, or summing the value, obtained by multiplying the value, obtained by applying the forgetting factor to the offset torque, by the predetermined gain, and a minimum value configured to indicate minimum offset torque; and as the offset torque configured so that the forgetting factor is applied thereto, a maximum value between the value proportional to the derivative of the input torque and a value configured to decay, obtained by applying the forgetting factor to the offset torque in a previous time step, is used.

14. The torque control method of claim 1, wherein the drive system state information includes backlash information in the drive system and shaft torsion information in the drive system.

15. The torque control method of claim 14, wherein the shaft torsion information includes a shaft torsional speed determined from input torque applied to the drive system by a motor configured to drive the vehicle and spring stiffness of the drive system, wherein the backlash information includes a backlash speed caused by a drive system rotation speed difference between the motor and a driving wheel, and wherein a corresponding one of the offset torques configured to be the values varied depending on drive system state information is determined by summing, by the controller, values obtained by multiplying absolute values of the backlash speed and the shaft torsional speed by respective predetermined coefficients.

16. The torque control method of claim 15, wherein the spring stiffness of the drive system is determined from the drive system rotation speed difference and the input torque, wherein the drive system rotation speed difference is determined as a difference value between a motor speed and an equivalent wheel speed, and wherein the equivalent wheel speed is an equivalent wheel speed at the motor speed, determined from a wheel speed using a gear ratio between the motor and the driving wheel.

17. The torque control method of claim 15, wherein the backlash speed is determined as a value obtained by filtering a difference value between the drive system rotation speed difference and the shaft torsional speed, wherein the drive system rotation speed difference is determined as a difference value between a motor speed and an equivalent wheel speed, and wherein the equivalent wheel speed is an equivalent wheel speed at the motor determined from a wheel speed using a gear ratio between the motor and the driving wheel.

18. The torque control method of claim 15, wherein the input torque is a predetermined one of the overall torque command corresponding to a motor torque command, an estimated motor torque value estimated by a motor control unit, a detected motor torque value detected by a torque sensor, a value obtained by applying a filter to the overall torque command, a value obtained by applying a filter to the estimated motor torque value, and a value obtained by applying a filter to the detected motor torque value.

19. The torque control method of claim 1, wherein the drive system state information includes input torque applied to the drive system by a motor configured to drive the vehicle, a rotation speed of an input unit of the drive system, and a rotation speed of an output unit of the drive system, a corresponding one of the offset torques configured to be the values varied depending on drive system state information is determined:

after determining, by the controller, drive system model-based transmission torque from the input torque, the rotation speed of the input unit of the drive system, and the rotation speed of the output unit of the drive system using a drive system model of the vehicle set to include a gear model;

as a value obtained by summing, by the controller, values obtained by applying predetermined weights to the transmission torque and a slope thereof, respectively.

20. A drive system of an electric vehicle, the drive system comprising:

a front wheel motor;

a rear wheel motor;

a front wheel-side drive system operably connected to the front wheel motor and a rear wheel-side drive system connected to the rear wheel motor;

a controller including a processor operably connected to the front wheel-side drive system and the rear wheel-side drive system; and a non-transitory storage medium containing program instructions, wherein the processor is configured for, by executing the program instructions, determining an overall torque command based on a requested torque depending on a vehicle driving state; and determining a front wheel torque command and a rear wheel torque command configured to track the overall torque command, in a state in which a responsiveness preferred mode, configured so that a front wheel torque control and a rear wheel torque control to evade respective backlash bands corresponding to torque areas of the front wheel-side drive system and the rear wheel-side drive system, in which backlash is capable of occurring, are performed, is selected, wherein the front wheel torque command is determined as a value of being equal to or less than a maximum front wheel torque threshold set to a negative (−) torque value, wherein the rear wheel torque command is determined as a value of equal to or greater than a minimum rear wheel torque threshold set to a positive (+) torque value, and wherein when an absolute value of the maximum front wheel torque threshold, and the minimum rear wheel torque threshold are referred to as offset torques, the offset torques are values varied depending on drive system state information.

* * * * *